United States Patent
Kikuchi et al.

(10) Patent No.: US 7,687,752 B2
(45) Date of Patent: Mar. 30, 2010

(54) FOCUS DETECTION DEVICE HAVING A PLURALITY OF FOCUSING POINTS AND CONTROLLING THE OUTPUT OF DATA FROM THE FOCUSING POINTS

(75) Inventors: Tetsuo Kikuchi, Hachioji (JP); Kosei Tamiya, Sagamihara (JP)

(73) Assignees: Olympus Corporation, Tokyo (JP); Olympus Imaging Corp., Tokyo (JP)

( * ) Notice: Subject to any disclaimer, the term of this patent is extended or adjusted under 35 U.S.C. 154(b) by 872 days.

(21) Appl. No.: 11/398,485

(22) Filed: Apr. 4, 2006

(65) Prior Publication Data
US 2007/0230936 A1 Oct. 4, 2007

(30) Foreign Application Priority Data

Apr. 4, 2005 (JP) ............................... 2005-107526
Apr. 4, 2005 (JP) ............................... 2005-107527

(51) Int. Cl.
*G02B 27/40* (2006.01)
*G01B 11/14* (2006.01)
*G01B 11/02* (2006.01)

(52) U.S. Cl. .................. 250/201.2; 369/53.16; 347/241

(58) Field of Classification Search ............... 250/201.2; 369/53.16; 347/241
See application file for complete search history.

(56) References Cited

U.S. PATENT DOCUMENTS 6,330,020 B1 * 12/2001 Kamioka .................... 347/241

FOREIGN PATENT DOCUMENTS

JP 10-333022 12/1998

* cited by examiner

*Primary Examiner*—Seung C Sohn
(74) *Attorney, Agent, or Firm*—Straub & Pokotylo; John C. Pokotylo

(57) ABSTRACT

The present invention discloses a focus detection device capable of reading a plurality of focus detection outputs in parallel. As an exemplary structure, the focus detection device includes a focus detection sensor having a plurality of output terminals for outputting, in parallel, analog data corresponding to focus states of multiple points in the field of a viewfinder, a multiplexer for arranging and outputting, in series order on the one terminal, the analog data output in parallel from the plurality of output terminals of the focus detection sensor, and an A/D converter for converting, to digital data, the analog data arranged in series order on the one terminal through and output from the multiplexer.

20 Claims, 21 Drawing Sheets

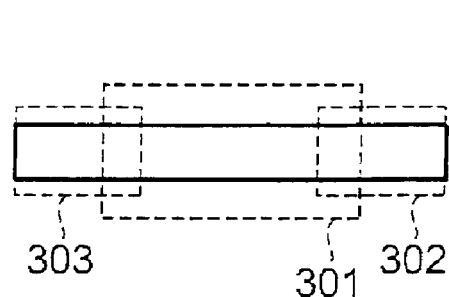 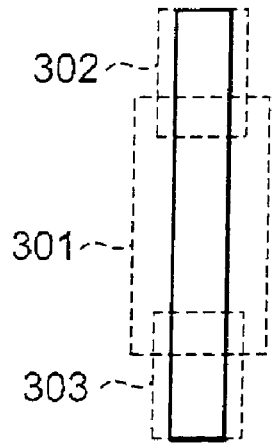
Fig. 9A　　　Fig. 9B
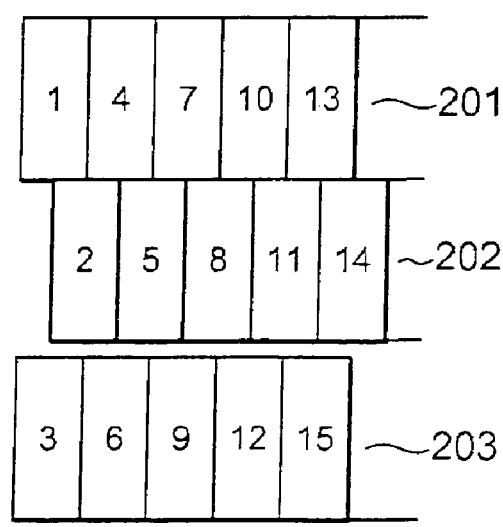
Fig. 10

| ADDRESS | DATA NAME |
| --- | --- |
| 0x0000 | FIRST PIXEL IN PIXEL ROW 1 ON STANDARD SIDE |
| 0x0001 | SECOND PIXEL IN PIXEL ROW 1 ON STANDARD SIDE |
| 0x0002 | FOURTH PIXEL IN PIXEL ROW 1 ON STANDARD SIDE |
| 0x0003 | FIFTH PIXEL IN PIXEL ROW 1 ON STANDARD SIDE |
| ... | ... |
| 0x008B | M-TH PIXEL IN PIXEL ROW m-1 ON STANDARD SIDE |
| 0x008C | FIRST PIXEL IN PIXEL ROW 1 ON REFERENCE SIDE |
| 0x008D | SECOND PIXEL IN PIXEL ROW 1 ON REFERENCE SIDE |
| 0x008E | FOURTH PIXEL IN PIXEL ROW 1 ON REFERENCE SIDE |
| 0x008F | FIFTH PIXEL IN PIXEL ROW 1 ON REFERENCE SIDE |
| ... | ... |
| 0x0117 | M-1-TH PIXEL IN PIXEL ROW 1 ON REFERENCE SIDE |
| 0x0118 | THIRD PIXEL IN PIXEL ROW 1 ON STANDARD SIDE |
| 0x0119 | SECOND PIXEL IN PIXEL ROW 1 ON STANDARD SIDE |
| 0x011A | SIXTH PIXEL IN PIXEL ROW 1 ON STANDARD SIDE |
| 0x011B | FIFTH PIXEL IN PIXEL ROW 1 ON STANDARD SIDE |
| ... | ... |
| 0x01A3 | M-1-TH PIXEL IN PIXEL ROW m ON STANDARD SIDE |
| 0x01A4 | THIRD PIXEL IN PIXEL ROW 1 ON REFERENCE SIDE |
| 0x01A5 | SECOND PIXEL IN PIXEL ROW 1 ON REFERENCE SIDE |
| ... | ... |
| 0x022F | M-1-TH PIXEL IN PIXEL ROW 1 ON REFERENCE SIDE |
| 0x0230 | FIRST PIXEL IN PIXEL ROW 2 ON STANDARD SIDE |
| ... | ... |
| 0x649F | M-1-TH PIXEL IN PIXEL ROW 46 ON REFERENCE SIDE |

Fig. 11

| ADDRESS | DATA NAME |
|---|---|
| 0x0000 | FIRST PIXEL IN PIXEL ROW 1 ON STANDARD SIDE |
| 0x0001 | FOURTH PIXEL IN PIXEL ROW 1 ON STANDARD SIDE |
| 0x0002 | SEVENTH PIXEL IN PIXEL ROW 1 ON STANDARD SIDE |
| 0x0003 | TENTH PIXEL IN PIXEL ROW 1 ON STANDARD SIDE |
| ... | ... |
| 0x0045 | 3M-2-TH PIXEL IN PIXEL ROW m ON STANDARD SIDE |
| 0x0046 | FIRST PIXEL IN PIXEL ROW 1 ON REFERENCE SIDE |
| 0x0047 | FOURTH PIXEL IN PIXEL ROW 1 ON REFERENCE SIDE |
| 0x0048 | SEVENTH PIXEL IN PIXEL ROW 1 ON REFERENCE SIDE |
| 0x0049 | TENTH PIXEL IN PIXEL ROW 1 ON REFERENCE SIDE |
| ... | ... |
| 0x008B | 3M-2-TH PIXEL IN PIXEL ROW 1 ON REFERENCE SIDE |
| 0x008C | SECOND PIXEL IN PIXEL ROW 1 ON STANDARD SIDE |
| 0x008D | FIFTH PIXEL IN PIXEL ROW 1 ON STANDARD SIDE |
| 0x008E | EIGHTH PIXEL IN PIXEL ROW 1 ON STANDARD SIDE |
| 0x008F | ELEVENTH PIXEL IN PIXEL ROW 1 ON STANDARD SIDE |
| ... | ... |
| 0x00D1 | 3M-1-TH PIXEL IN PIXEL ROW m ON STANDARD SIDE |
| 0x00D2 | SECOND PIXEL IN PIXEL ROW 1 ON REFERENCE SIDE |
| 0x00D3 | FIFTH PIXEL IN PIXEL ROW 1 ON REFERENCE SIDE |
| ... | ... |
| 0x0117 | 3M-1-TH PIXEL IN PIXEL ROW m ON STANDARD SIDE |
| 0x0118 | THIRD PIXEL IN PIXEL ROW 2 ON STANDARD SIDE |
| ... | ... |
| 0x01A3 | 3M-TH PIXEL IN PIXEL ROW 1 ON REFERENCE SIDE |
| 0x01A4 | FIRST PIXEL IN PIXEL ROW 2 ON STANDARD SIDE |
| ... | ... |
| 0x4B78 | 3M-TH PIXEL IN PIXEL ROW 46 ON REFERENCE SIDE |

Fig. 12

| φ(x) | DRV(x) | φa(x) |
|---|---|---|
| 0 | 0 | 0 |
| 1 | 0 | 1 |
| 0 | 1 | Z |
| 1 | 1 | Z |

FOCUS DETECTION DEVICE HAVING A PLURALITY OF FOCUSING POINTS AND CONTROLLING THE OUTPUT OF DATA FROM THE FOCUSING POINTS

CROSS-REFERENCE TO RELATED APPLICATION

This application is based upon and claims the benefit of priority from prior Japanese Patent Application Nos. 2005-107526, filed on Apr. 4, 2006; and 2005-107527, filed on Apr. 4, 2006, the entire contents of which are incorporated herein by reference.

BACKGROUND OF THE INVENTION

1. Field of the Invention

The present invention relates to a focus detection device and method capable of detecting focus states at multiple points in the field of a viewfinder.

2. Description of the Related Art

With the recent trend toward high-performance, highly functional cameras, various techniques have been proposed for focus detection devices capable of detecting focus states at many points in the field of a viewfinder.

For example, Japanese Patent Laid-Open No. 10-333022 proposes a focus detection device in which focus detection portions 701, 703, 705, 707 on a standard side and focus detection portions 702, 704, 706, 708 on a reference side are arranged as shown in FIG. 26A.

The outputs of these eight focus detection portions 701-708 are input into selection means 709, respectively. The selection means 709 reads the outputs of the focus detection portions 701-708 sequentially on a portion-by-portion basis as shown in FIG. 26B under the control of sensor control means 710, and outputs them to a processing part located downstream of the selection means. The processing part performs AF calculations based on the reading results.

BRIEF SUMMARY OF THE INVENTION

The present invention can provide a focus detection device capable of high-speed reading of data without increasing the reading time even when the amount of data from focus detection portions becomes enormous.

The focus detection device of the present invention can read the outputs of a plurality of focus detection portions in parallel.

In one aspect of the present invention, there is provided a focus detection device comprising: a focus detection sensor having a plurality of output terminals for outputting, in parallel, analog data corresponding to focus states at plural points in the field of a viewfinder; a multiplexer for arranging and outputting, in series order on one terminal, the analog data output in parallel from the plurality of output terminals of the focus detection sensor; and an A/D converter for converting, to digital data, the analog data arranged in series order on one terminal through and output from the multiplexer.

In another aspect of the present invention, there is provided a focus detection device comprising: a plurality of focus detecting portions for detecting two subject images passing through different optical paths substantially in the vertical direction of a main optical system and two subject images passing through different optical paths substantially in the horizontal direction of the main optical system; a multiplexer for reading the outputs of the plurality of focus detecting portions to output them selectively; and a controller for controlling the operation of only designated focus detecting portions while controlling the multiplexer to arrange, in series order on one terminal, the outputs of the focus detecting portions read at the same time into the multiplexer.

The present invention can also be understood as a focus detection method.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIGS. 9A and 9B are schematic diagrams of how to divide each pixel row into correlation calculation frames;

FIG. 10 is a diagram showing the concept of the order of reading sensor data;

FIG. 11 is a table showing the location of sensor data in a memory at the time of zigzag calculation;

FIG. 12 is a table showing the location of sensor data in the memory at the time of non-zigzag calculation;

DETAILED DESCRIPTION OF THE PREFERRED EMBODIMENTS

Preferred embodiments of the invention are described below with reference to the accompanying drawings.

First Embodiment

Before describing the details of a first embodiment, the main part of a focus detection device is described below.

Figure 1:
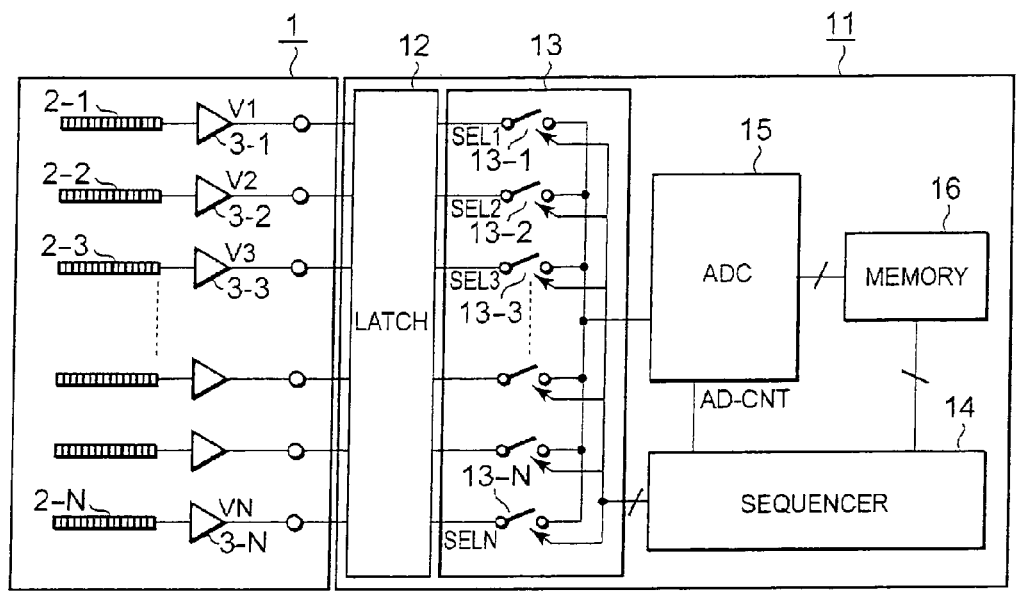
FIG. 1 is a block diagram showing the main part of a focus detection device according to one preferred embodiment of the present invention.

FIG. 1 is a block diagram showing the main part of the focus detection device according to one preferred embodiment of the present invention. As shown in FIG. 1, the focus detection device consists of two chips: one is for an AF sensor 1 as a focus detection sensor and the other is for an AF controller 11.

The AF sensor 1 is provided with a plurality of rows of pixels 2-1 to 2-N for photoelectrically converting a subject image at a plurality of focusing points in the field of a viewfinder, respectively. These rows of pixels 2-1 to 2-N are connected to charge-voltage conversion amplifiers 3-1 to 3-N, respectively. The output terminals of these charge-voltage conversion amplifier 3-1 to 3-N correspond to the output terminals of the AF sensor 1. These output terminals are connected to the AF controller 11.

At the input stage of the AF controller 11, a latch circuit 12 is provided so that the output terminals of the AF sensor 1 are connected to the latch circuit, respectively. The number of output terminals of the latch circuits 12 is equal to that of the output terminals of the AF sensor 1, and these output terminals of the latch circuit 12 are connected to the multiplexer 13, respectively. The multiplexer 13 is provided with switches 13-1 to 13-N as many as the output terminals of the latch circuit 12. These switches 13-1 to 13-N are closed in response to control signals sel1 to selN from a sequencer 14, respectively.

The other ends of the switches 13-1 to 13-N are connected together to the output terminal of the multiplexer 13. The output terminal of the multiplexer 13 is connected to an A/D converter 15 (abbreviated as ADC in FIG. 1). The A/D converter 15 operates in response to a control signal ad-cnt from the sequencer 14. The output terminal of the A/D converter 15 is connected to a memory 16. Digital data output from the A/D converter 15 are written into the memory 16 in a predetermined order under the control of the sequencer 14.

Figures 17A, 17B:
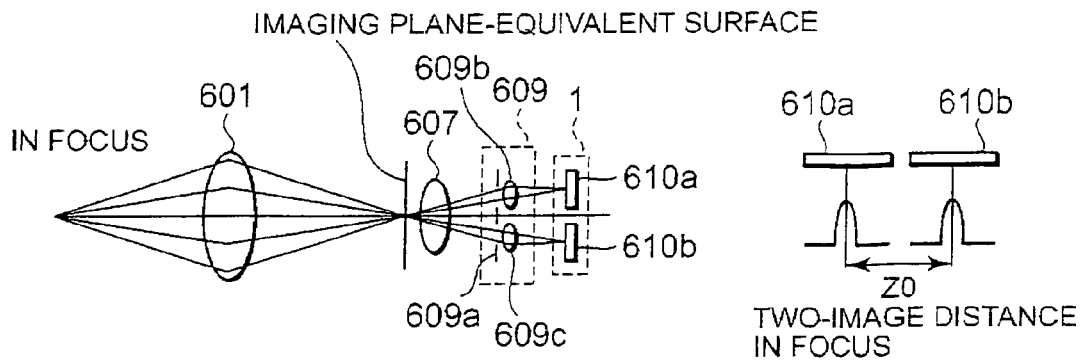
FIGS. 17A to 17F are illustrations to explain the operation of the focus detection device.
Figures 17C, 17D:
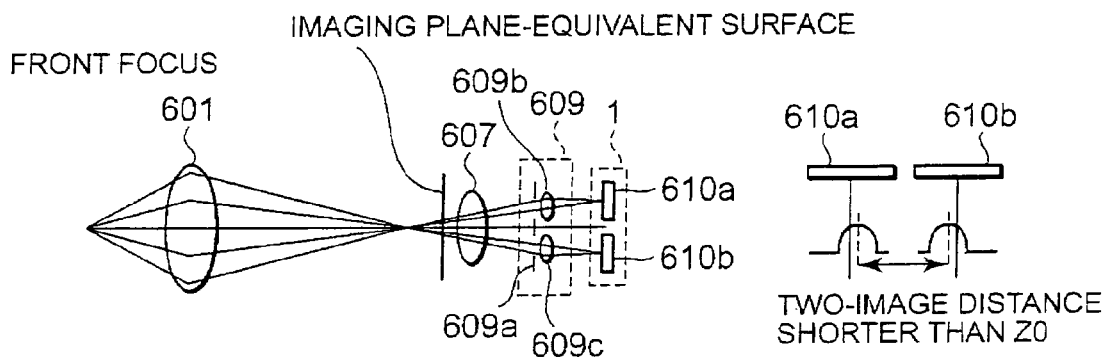
Figures 17E, 17F:
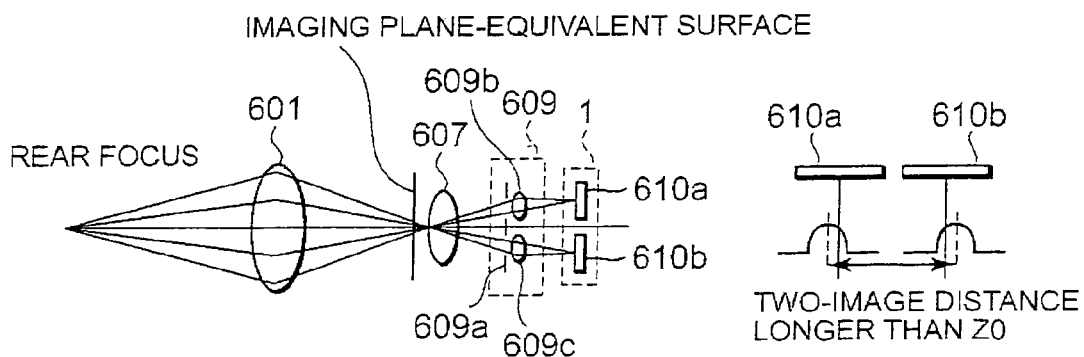

FIGS. 17A to 17F are illustrations to explain the operation of the focus detection device. FIGS. 17A and 17B show a case where a focus lens is at an in-focus position. FIGS. 17C and 17D show a case where the focus lens is in front of the in-focus position (front focus). FIGS. 17E and 17F show a case where the focus lens is behind the in-focus position (rear focus).

As shown in FIGS. 17A to 17F, light passing through the focus lens 601 is condensed, and then incident on a pair of AF sensors 610 via a condenser lens 607 and a pupil-splitting optical system 609.

For example, when the focus detection device according to the preferred embodiment is used in a single lens reflex camera, light of a subject image passing through the focus lens 601 is formed on an imaging plane-equivalent surface through a main mirror and a sub mirror. The imaging plane-equivalent surface is a virtual surface located at a position optically equivalent to the position of the imaging plane of an image pickup device in the camera.

The subject image formed on the imaging plane-equivalent surface is guided to the pupil-splitting optical system 609 through the condenser lens 607. The pupil-splitting optical system 609 has a separator aperture 609a and separator lenses 609b, 609c. The light of the subject image thus guided to the pupil-splitting optical system 609 is pupil-split into a pair of light beams through the separator aperture 609a. As shown in FIGS. 17A, 17C, and 17E, one beam of the pair of light beams, which corresponds to one part of the subject image passing through the upper part of the focus lens 601 is re-imaged on a focus detecting area 610b in the AF sensor 1 through the separator lens 609c. Similarly, the other beam of the pair of light beams, which corresponds to the other part of the subject image passing through the lower part of the focus lens 601 is reimaged on a focus detecting area 610a in the AF sensor 1.

If the subject is in focus, the distance between two images re-imaged on the focus detecting areas 610a and 610b is Z0 as shown in FIG. 17B. In the case of front focus, the distance between the two images becomes shorter than Z0 as shown in FIG. 17D, while in the case of rear focus, the distance between the two images becomes longer than Z0 as shown in FIG. 17F. The distance between the two images varies roughly in proportion to defocus amount. Therefore, the defocus amount and defocus direction of the focus lens can be determined by detecting the distance between the two images.

The AF sensor 1 includes the plurality of focus detection portions 2-1 to 2-N. Each of the focus detection portions incorporates, or is connected to, a charge transfer channel, a charge-voltage conversion amplifier, and a driver.

Figure 18:
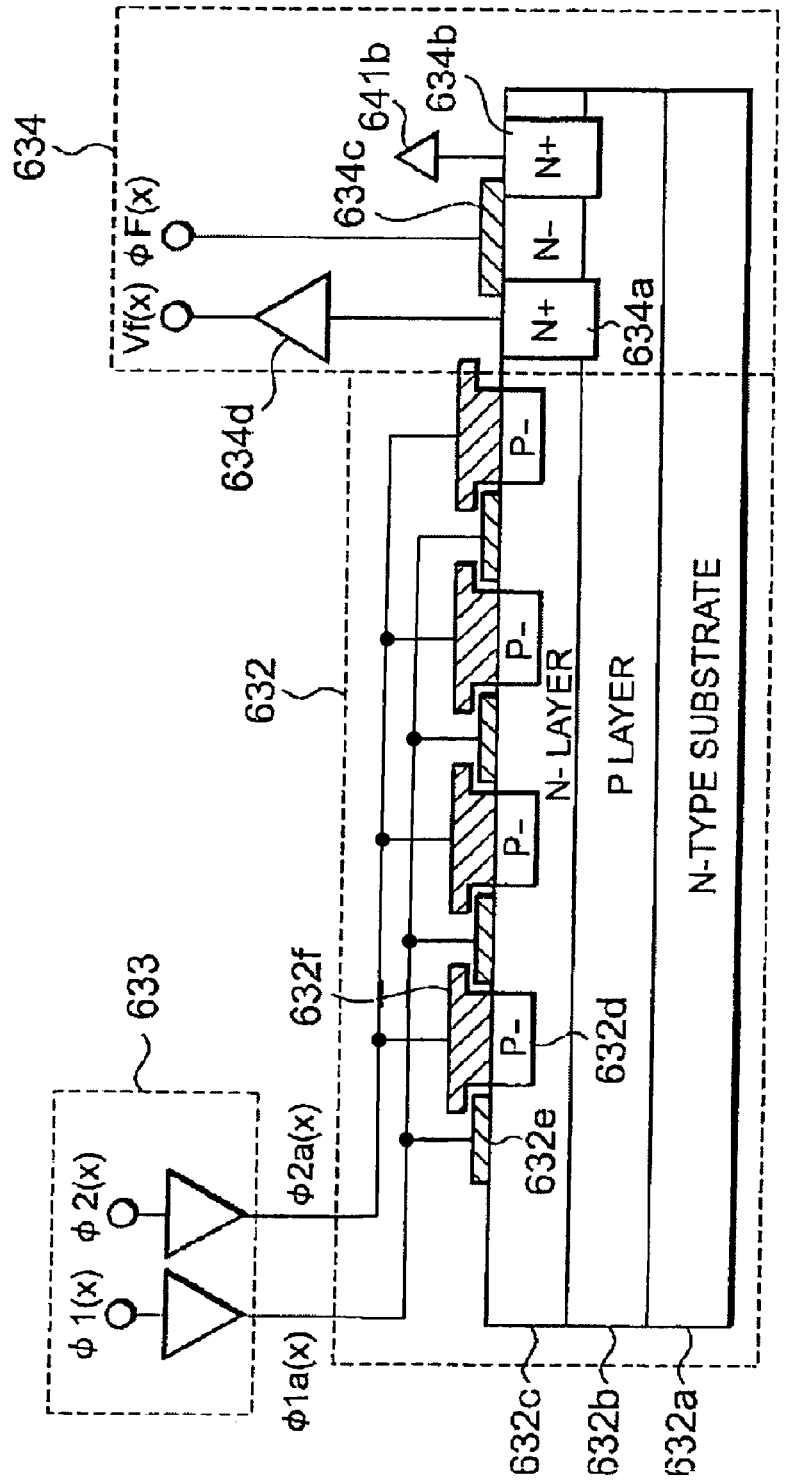
FIG. 18 is a cross-sectional view to explain the details of a charge transfer channel, a charge-voltage conversion amplifier, and a driver.

FIG. 18 is a cross-sectional view of the focus detection portion, showing the details of the charge transfer channel, the charge-voltage conversion amplifier, and the driver.

A charge transfer channel 632 has an n-type substrate 632a, a p- layer 632b and an n- layer 632c formed by epitaxial growth on the n-type substrate 632a, and p- regions 632d to divide the n- layer 632c. The charge transfer channel 632 further has polysilicon layer portions 632e formed on the surface of the n- layer 632c divided by the p- regions 632d, and polysilicon layer portions 632f formed on the surfaces of the p- regions 632d, respectively. The polysilicon layer portions 632e are connected to a control signal $\phi 1a(x)$ output terminal of the driver 633, while the polysilicon layer portions 632f are connected to a control signal $\phi 2a(x)$ output terminal of the driver 633.

Further, the charge-voltage conversion amplifier 634 has an n-type MOS transistor acting as a switch and a buffer amplifier 634d.

The n-type MOS transistor is formed of an n+ region (drain region) 634a corresponding to the drain, an n+ region (source region) 634b corresponding to the source, and a gate region 634c. The drain region 634a is connected to the input of the buffer amplifier 634d. The source region 634b is connected to an electric power supply (common to an electric power supply 641b). The gate region 634c is connected to a control signal $\phi F(x)$ output terminal of the controller 11.

Although rows of pixels are not shown in FIG. 18, they are actually arranged on the front or back side of FIG. 18. Photoelectric charge generated in and detected from each of pixels in row is also applied to the regions of the n-layer 632c of the charge transfer channel 632 at the same time. Here, since the control signals φ1a(x) and φ2a(x) in opposite phases to each other are applied from the driver 633 to the polysilicon layer portions 632e and the polysilicon layer portions 632f, respectively, the photoelectric charge applied to these n-regions 632c is transferred from left to right in FIG. 18 according to the variations in the potential.

The driver 633 converts a control signal φ1(x) from the controller 11 to the control signal φ1a(x), and a control signal φ2(x) from the controller 11 to the control signal φ2a(x). To this end, it is necessary to supply current for driving equivalent capacitances between the polysilicon layers 632e, 632f and the p layer 632b, and between the polysilicon layer 632e and the polysilicon layer 632f, respectively. If the equivalent capacitance connected to one of the polysilicon layers is Cd, the transfer rate of the photoelectric charge is F, the amplitude of the control signals φ1a(x) and φ2a(x) applied by the driver 633 is V, and the number of pixel rows is n, the current to be flown through the driver 33 is represented by the following equation 1):

$$Idrv = n*Cd*V*F \quad\quad\quad 1)$$

The equation 1) indicates that the current flowing through the driver 633 becomes larger as the transfer rate of the photoelectric charge becomes higher or as the photoelectric charge is extracted from each row of pixels at higher speed.

The following describes the operation of the charge-voltage conversion amplifier 634. The charge-voltage conversion amplifier 634 coverts electric charge Q transferred from the charge transfer channel 632 to voltage Vf shown in the following equation 2):

$$Vf = Q/Cf \quad\quad\quad 2)$$

where Cf denotes parasitic capacitance in the n+ region 634a corresponding to the drain of the n-type MOS transistor.

The following describes the operation of the focus detection portion structured as shown in FIG. 18.

First, the photoelectric charge accumulated in each pixel is transferred to the charge transfer channel 632 in response to the control signals. The photoelectric charge transferred to the charge transfer channel 632 is transferred in the direction of heading for the charge-voltage conversion amplifier 634 (to the right in FIG. 18) in response to the input of the control signals φ1a(x) and φ2a(x) from the driver 633 to the charge transfer channel 632. Here, during the period when the control signal φ1a(x) is high and the control signal φ2a(x) is low, if pulsed voltage as the control signal φF(x) is applied to the gate region 634c of the charge-voltage conversion amplifier 634, the output voltage Vf(x) of the charge-voltage conversion amplifier 634 is represented in the following equation 3):

$$Vf(x) = Vdd \quad\quad\quad 3)$$

where Vdd is power supply voltage.

On the other hand, during the period when the control signal φ1a(x) is high and the control signals φ2a(x) is low, if the control signal φF(x) is not applied to the charge-voltage conversion amplifier 634, the output voltage Vf(x) of the charge-voltage conversion amplifier 634 is represented as the following equation 4):

$$Vf(x) = Vdd - dV \quad\quad\quad 4)$$

where dV is a voltage determined by the inflow of unnecessary electric charge caused by the switching of control signal φF(x).

Further, when the high and low relationship of the control signals φ1a(x) and φ2a(x) is reversed, if the photoelectric charge is transferred from the charge transfer channel 632 to the n+ region 634a of the charge-voltage conversion amplifier 634, the output voltage Vf(x) is represented as the following equation 5):

$$Vf(x) = Vdd - dV - Q/Cf \quad\quad\quad 5)$$

Next, based on the above description, the first embodiment of the present invention is described with reference to the accompanying drawings. The first embodiment of the present invention takes as an example a focus detection device capable of detecting light beams of a subject image substantially In the horizontal and vertical directions of the imaging plane, respectively. This kind of focus detection device can be made up by arranging a pair of focus detecting areas substantially in the horizontal direction of the imaging plane and a pair of focus detecting areas substantially in the vertical direction of the imaging plane. This type of focus detection device also needs a pair of pupil-splitting optical systems 9 in the horizontal and vertical directions of the imaging plane, respectively.

Figures 19, 20:
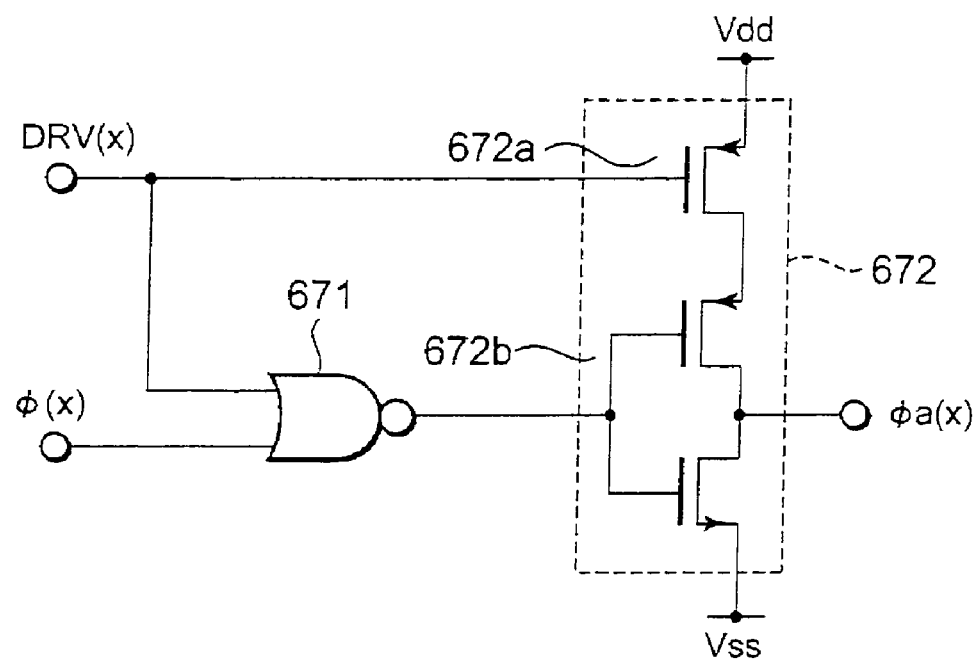
FIG. 19 is a circuit diagram showing the structure of a conversion circuit for converting a control signal $\phi(x)$ to a control signal $\phi a(x)$ in the driver.
FIG. 20 is a table showing the input/output relationship of the driver.

The following describes the driver 633 of FIG. 18 in further detail. FIG. 19 is a circuit diagram showing the structure of a conversion circuit for converting the control signal φ(x) to the control signal φa(x) in the driver 633. In the actual design, two circuits shown in FIG. 19 are provided in the driver 633 for converting the control signals φ1(x) and control signal φ2(x), respectively.

The conversion circuit shown in FIG. 19 has a two-input NOR gate 671 and an inverter 672 connected to the output terminal of the NOR gate 671.

As shown in FIG. 19, one input terminal of the NOR gate 671 is connected to an control signal DRV(x) output terminal of the controller 11, while the other input terminal of the NOR gate 671 is connected to the control signal φ(x) output terminal of the controller 11.

The inverter 672 consists of an n-type MOS transistor 672a acting as a switch and a CMOS inverter 672b connected to the n-type MOS transistor 672a. As shown in FIG. 19, the input terminal of the switch 672a is connected to the control signal DRV(x) output terminal of the controller 11. The input terminal of the CMOS inverter 672b is connected to the output terminal of the NOR gate 671. The output terminal of the CMOS inverter 672b is connected to the charge transfer channel 632.

FIG. 20 is a table showing the input/output relationship of the driver 633. In FIG. 20, 0 and 1 correspond to a low logic level and a high logic level, respectively.

First, when DRV(x) is 0, the switch 672a in the inverter 672 is on-state to enable the operation of the CMOS inverter 672b. In this case, if φ(x) is 0, the output of the NOR gate 671 is 1, and the output of CMOS inverter 672b, that is, the output φa(x) of the driver 633 is 0. On the contrary, if φ(x) is 1, the output of the NOR gate 671 is 0, and the output φa(x) of the driver 633 is 1.

When the operation of the CMOS inverter 672b is enabled, although the current Idrv (as shown in equation 1)) generally needs to flow through the driver 633, the magnitude of current flowing through the driver 633 shown in FIG. 20 can be determined based on the width/length ratio of the gate of the MOS transistor constituting the inverter 672.

On the other hand, if the DRV(x) is 1, the switch 672a in the inverter 672 is off-state. In this case, the CMOS inverter 672b is in a high-impedance state to disable the operation of the CMOS inverter 672b. In other words, no current flows through the driver 633 and no control signal φa(x) is output.

Figure 21:
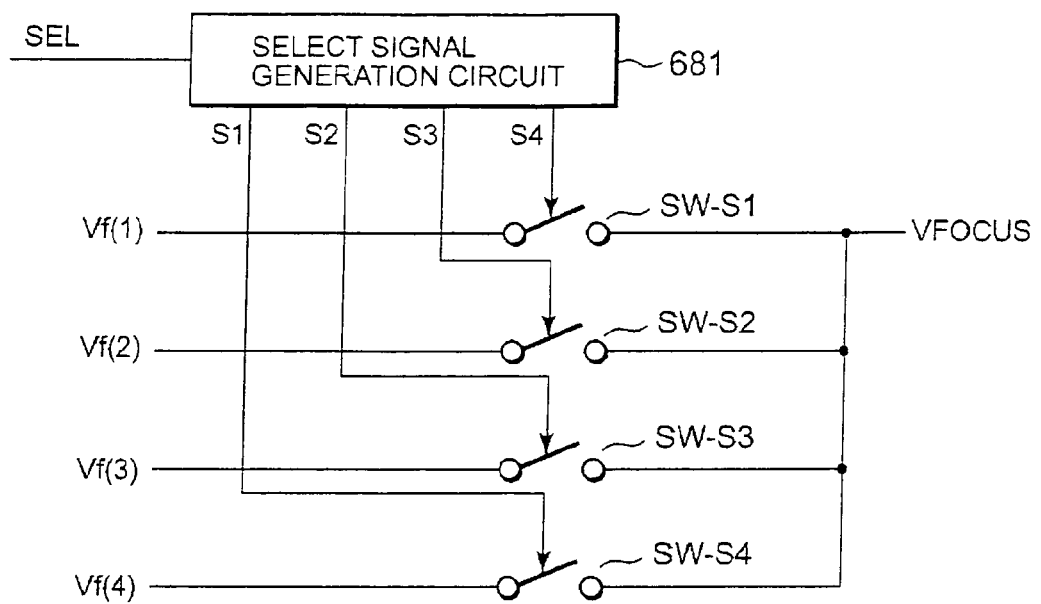
FIG. 21 is a diagram showing the internal structure of a multiplexer according to a first embodiment of the present invention.

The following describes the multiplexer 13 of FIG. 1 in further detail. FIG. 21 is a diagram showing the internal structure of the multiplexer 13. As shown in FIG. 21, the multiplexer 13 has a select signal generation circuit 681 and switches SW-S1 to SW-S4 provided as many as the input terminals of the multiplexer 13 (four switches in the example of FIG. 21).

In FIG. 21, the input terminal of the select signal generation circuit 681 is connected to a control signal SEL output terminal of the controller 11 so that a control signal SEL will be input from the controller 11 to the select signal generation circuit 681. The select signal generation circuit 681 has output terminals S1 to S4 provided as many as the input terminals of the multiplexer 13.

The select signal generation circuit 681 thus structured detects a pulse train of control signal SEL from the controller 11, and outputs select signals S1 to S4 from its output terminals, respectively, according to the detection results. The select signal S1 becomes high at the first pulse rise of the control signal SEL. The select signal S2 becomes high at the second pulse rise of the control signal SEL. The select signal S3 becomes high at the third pulse rise of the control signal SEL. The select signal S4 becomes high at the fourth pulse rise of the control signal SEL. These select signals S1 to S4 control the opening/closing of the switches SW-S1 to SW-S4, respectively. The following description assumes that each switch is closed when the output of the select signal generation circuit 681 is high, or open when the output of the select signal generation circuit 681 is low.

Further, in FIG. 21, one end of each of the switches SW-S1 to SW-S4 is connected to each of the output terminals Vf(1) to Vf(4) of the focus detection portions, respectively, and the other end is connected to the output terminal of the multiplexer 13.

Figure 22:
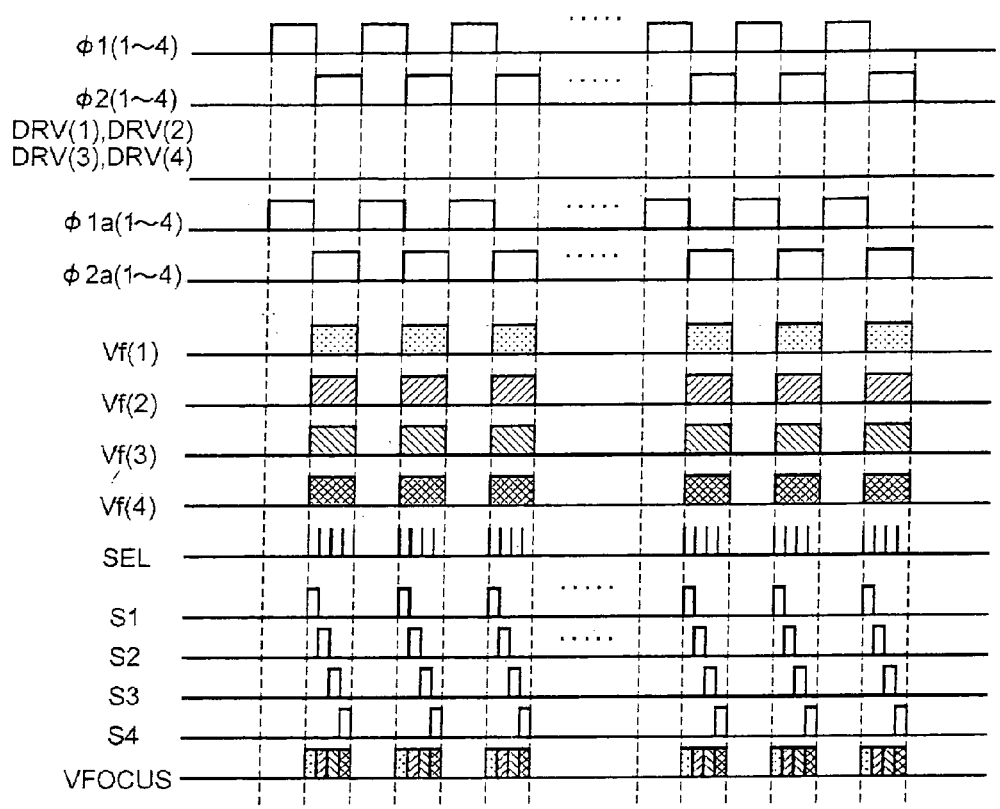
FIG. 22 is a timing chart showing the operation of four focus detection portions when they are all designated.
Figure 23:
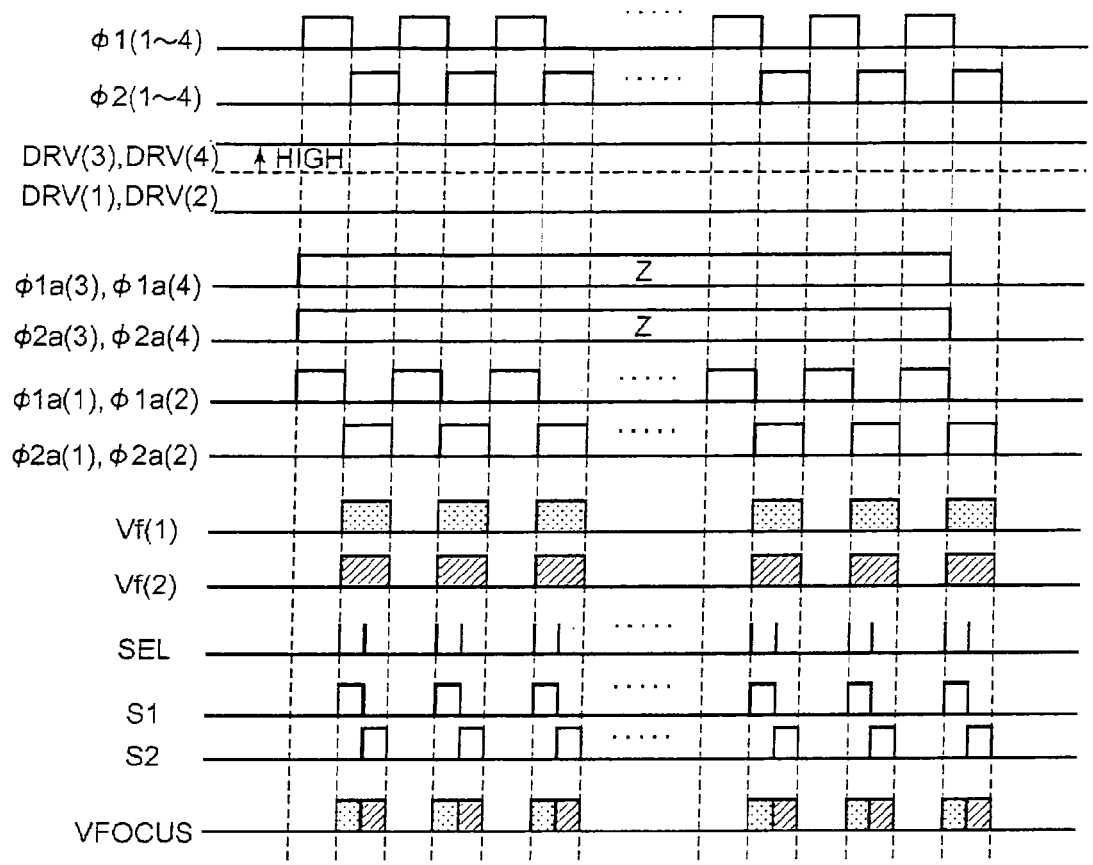
FIG. 23 is a timing chart showing the operation of focus detection portions associated with horizontal focus detection when only the horizontal focus detection portions are designated from among the four focus detection portions.

The operation of the focus detection device according to the first embodiment of the present invention is described below. FIGS. 22 and 23 are timing charts when the focus detection device according to the first embodiment is in operation. FIG. 22 shows a case where all the four focus detection portions are designated, while FIG. 23 shows a case where only the focus detection portions associated with horizontal focus detection are designated from among the four focus detection portions. The designation of the focus detection portions is made by the controller 11 in response to a control signal CNT.

First, the example of FIG. 22 is described. When photoelectric charge accumulated in each row of pixels in each focus detection portion is sent to the charge transfer channel 632, the control signals φ1(x) and φ2(x) are input from the controller 11 to the driver 633 in each focus detection portion, respectively. The control signal DRV(x) is also input from the controller 11 to the driver 633 at the same time. The control signal DRV(x) changes only the designated focus detection portions to the low level. In the example of FIG. 22, since all the focus detection portions are designated, DRV(1), DRV(2), DRV(3), and DRV(4) all become low.

Further, during the period when φ2(x) is high, such a control signal SEL to generate a train of pulses (four pulses in this example) as many as the designated number of times of focus detection is input from the controller 11 to the multiplexer 13. When the control signal SEL is input into the multiplexer 13, the select signal S1 is output from the select signal generation circuit 681 of the multiplexer 13 at the rise of the first pulse of the control signal SEL to close the switch SW-S1. Then, the select signal S2 is output at the second pulse rise to close the switch SW-S2, the select signal S3 is output at the third pulse rise to close the switch SW-S3, and the select signal S4 is output at the fourth pulse rise to close the switch SW-S4 in this order.

This operation of the focus detection device causes the multiplexer 13 to output a focus detection output signal Vfocus obtained by arranging the output signals Vf(1) to Vf(4) from the focus detection portions in series order on one terminal.

In the example of FIG. 22, since the output signals Vf(x) from the focus detection portions are read in parallel, the total time $t_{all}$ required to read the outputs of all the designated focus detection portions is represented as the following equation 6):

$$t_{all} = t0 \qquad 6)$$

where t0 denotes the time required to read the output of one focus detection portion.

Next, the example of FIG. 23 is described. When photoelectric charge accumulated in the rows of pixels 2-1 to 2-N in each focus detection portion is sent to the charge transfer channel 632, the control signals φ1(x) and φ2(x) are input from the controller 11 to the driver 633 in each focus detection portion, respectively. The control signal DRV(x) is also input from the controller 11 to the driver 633 at the same time. In the example of FIG. 23, since only two of the four focus detection portions are designated, DRV(1) and DRV(2) become low and DRV(3) and DRV(4) become high. Therefore, the drivers 633 of the two focus detection portions become a high-impedance state.

Further, during the period when φ2(x) is high, such a control signal SEL to generate a train of two pulses is input from the controller 11 to the multiplexer 13.

This operation of the focus detection device causes the multiplexer 13 to output a focus detection output signal Vfocus obtained by arranging the output signals Vf(1) and Vf(2) from the focus detection portions in series order on the one terminal.

In the example of FIG. 23, since the output signals Vf(x) from the focus detection portions are also read in parallel, the reading time required is the same as that represented as the equation 6) in the example of FIG. 22.

As described above, according to the first embodiment, since the output signals from the focus detection portions can be read in parallel, the reading time does not change even if the number of focus detection portions increases.

Further, according to the first embodiment, no current flows through the drivers 633 of the focus detection portions that are not designated for focus detection of the subject image. Therefore, if the number of focus detection portions designated is small enough, low-current operation can be achieved.

Second Embodiment

Figure 24:
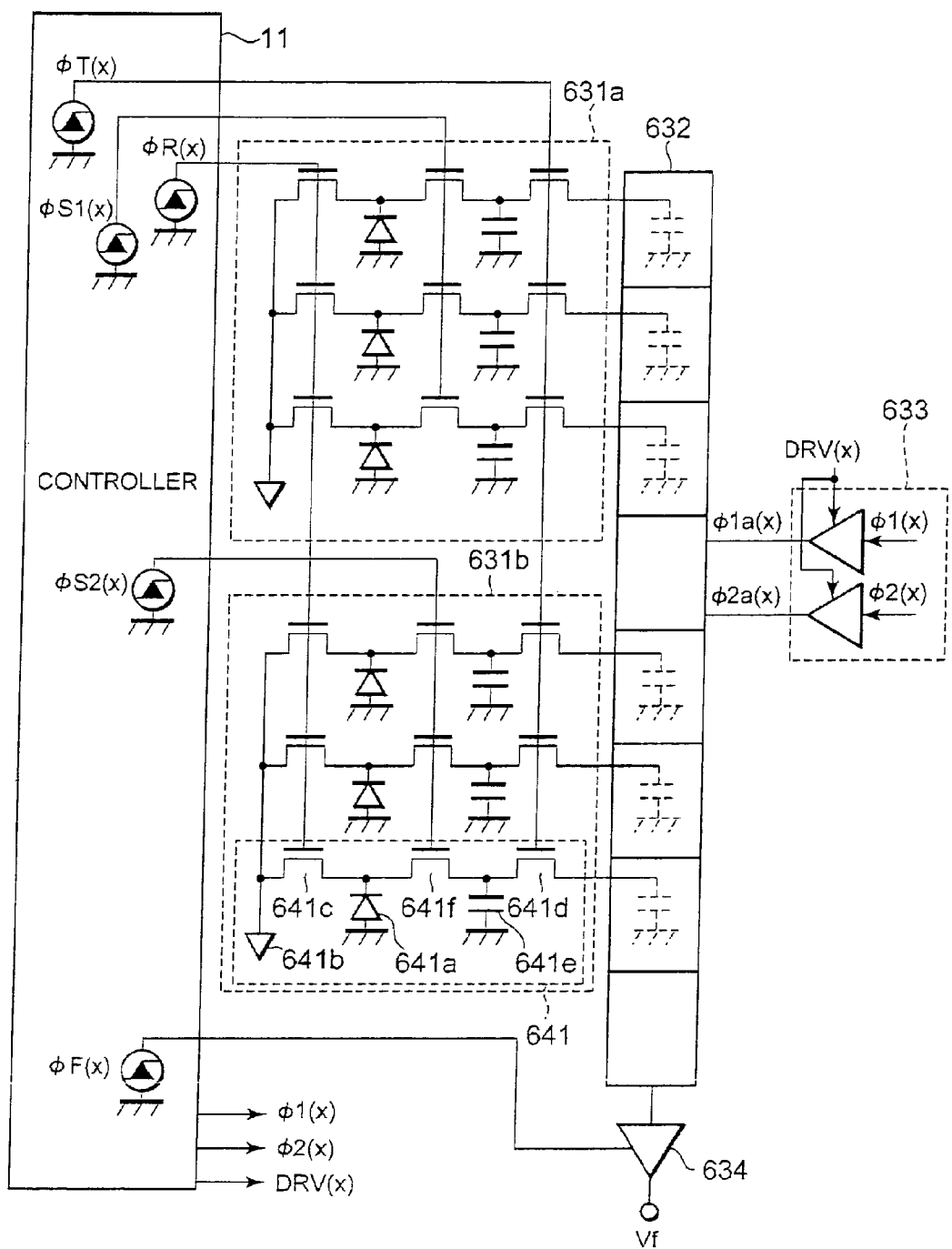
FIG. 24 is a circuit diagram showing the main structure of a focus detection device according to a second embodiment of the present invention.

The following describes a second embodiment of the present invention. FIG. 24 is a circuit diagram showing the main structure of a focus detection device according to the second embodiment of the present invention. Note that components and elements in FIG. 24 common to those in the first embodiment are given the same reference numerals and characters.

The second embodiment in FIG. 24 is different from the first embodiment in that a memory 641e composed of a capacitor or the like and a switch 641f connected between a photodiode 641a and the memory 641e are provided in each of pixels constituting each pixel row.

In other words, in the second embodiment as shown in FIG. 24, each of pixels 641 constituting each of the pixel rows 631a and 631b has the photodiode 641a, an electric power supply 641b, a switch 641c, a switch 641d, the memory 641e, and the switch 641f. In each pixel 641, one end of the photodiode 641a is connected to the switch 641c, and the other end of the switch 641c is connected to the electric power supply 641b. The one end of the photodiode 641a is also connected to the switch 641f, and the other end of the switch 641f is connected to the memory 641e. The memory 641e is also connected to the charge transfer channel 32 through the switch 641d.

In this structure, a control signal φR(x) is input from the controller 11 to the switches 641c in the pixel row 631a and the switches 641c in the pixel row 631b, respectively. A control signal φT(x) is input from the controller 11 to the switches 641d in the pixel row 631a and the switches 641d in the pixel row 631b, respectively. The switches 641f in the pixel row 631a and the switches 641f in the pixel row 631b are connected to different terminals of the controller 11, respectively, so that different control signals will be input. In other words, a control signal φS1(x) is input from the controller 11 to the switches 641f in the pixel row 631a, while a control signal φS2(x) is input from the controller 11 to the switches 641f in the pixel row 631b.

Figure 25:
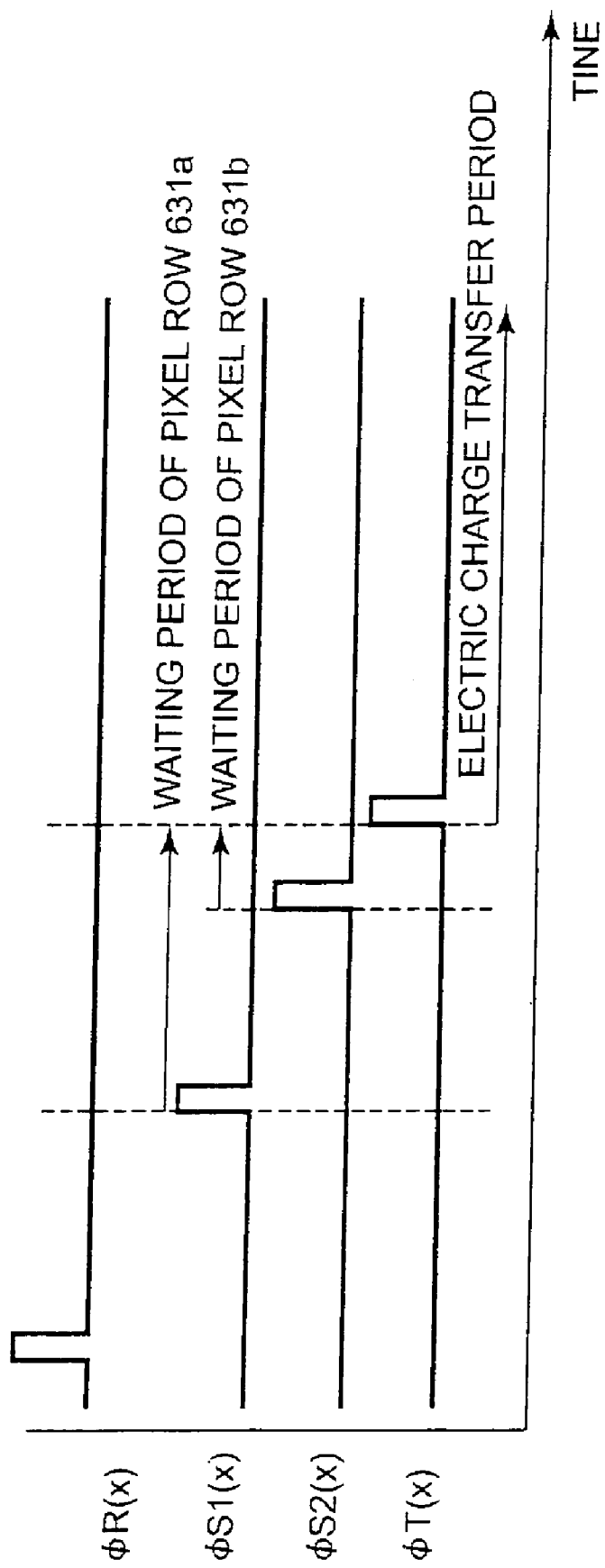
FIG. 25 is a timing chart showing a reading sequence for photoelectric charge detected from each pixel row of each focus detection portion.
Figure 26A:
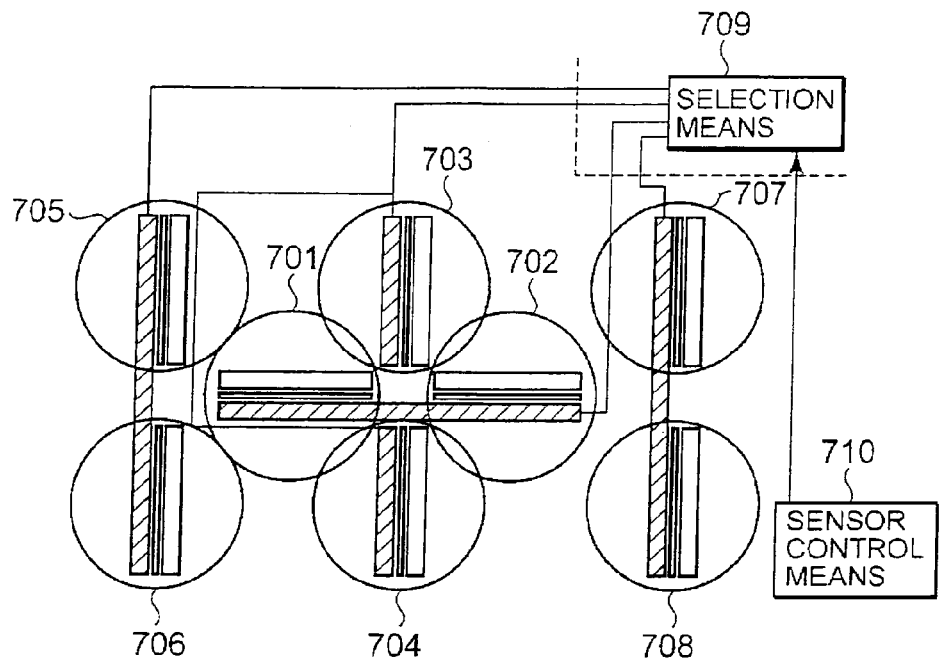
FIGS. 26A and 26B show prior art.
Figure 26B:
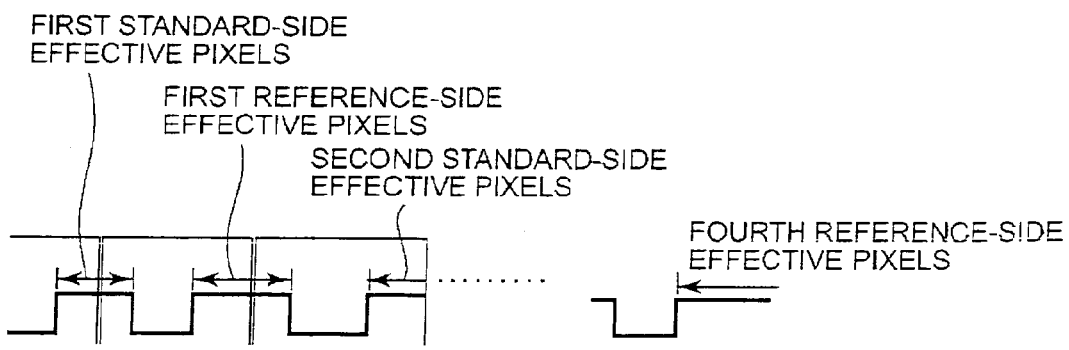

The operation of the focus detection device shown in FIG. 24 is described with reference to FIG. 25. FIG. 25 is a timing chart showing a reading sequence for photoelectric charge detected from each pixel row of each focus detection portion.

The operation of FIG. 25 is started at the timing when the control signal φR(x) for controlling the opening/closing of each switch 641c is changed from the high level to the low level. When the control signal φR(x) is input, the switch 641c is closed on the falling edge of the control signal to start accumulation of photoelectric charge in the photodiode 641a. In this condition, if the control signal φS1(x) or the control signal φS2(x) is input, the switch 641f is closed on the falling edge of the control signal to store, in the memory 641e, the photoelectric charge accumulated in the photodiode 641a.

Further, in this condition, if the control signal φT(x) is input, the switch 641d is closed on the falling edge of the control signal to transfer the photoelectric charge stored in the memory 641e to the charge transfer channel 32.

As described above, according to the second embodiment, the input timing of the control signal φS1(x) and the input timing of the control signal φS2(x) are controlled so that the time for accumulation of photoelectric charge in the rows of pixels can be controlled one a row-by-row basis.

In FIG. 24, two pixel rows are taken as an example, the number of pixel rows can be three or more.

Third Embodiment

Figure 2:
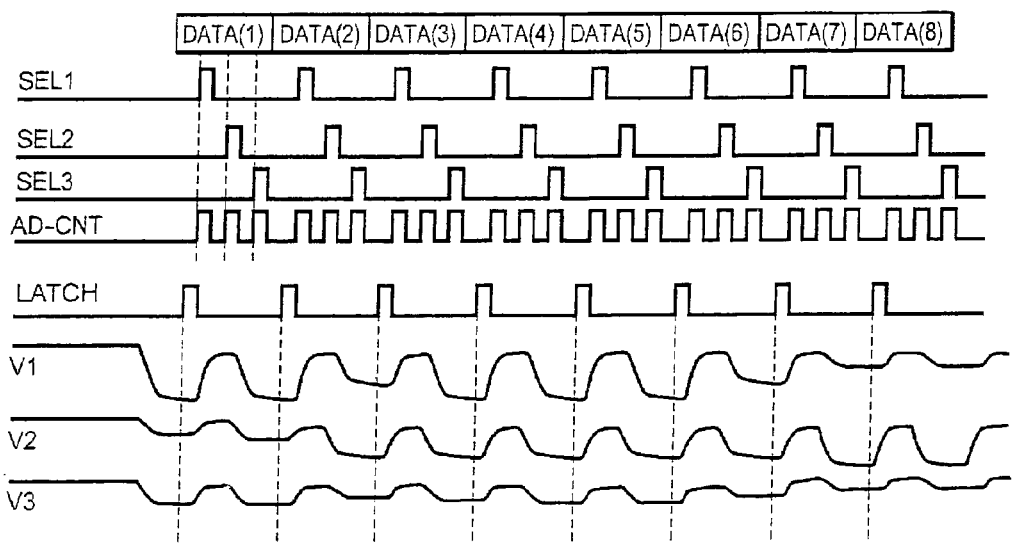
FIG. 2 is a timing chart when the focus detection device shown in FIG. 1 is in operation.

The following describes a third embodiment of the present invention. In the third embodiment, the operation of the focus detection device shown in FIG. 1 is first described with reference to a timing chart of FIG. 2. In FIG. 2, the number of output terminals of the AF sensor 1 is three for simplicity of illustration, but the same goes for a case where the number of output terminals is N.

Photoelectric charge obtained in the rows of pixels 2-1 to 2-3 inside the AF sensor 1 is converted through the charge-voltage conversion amplifiers 3-1 to 3-3 into voltage signals V1 to V3, respectively, and input into the latch circuit 12 inside the AF controller 11. Each of the voltage signals V1 to V3 input in the latch circuit 12 is held at constant intervals synchronized with the output cycles of the AF sensor 1, that is, the cycles of outputting the output signal for one pixel from each of the output terminals of the AF sensor 1. Then, each of the voltage signals V1 to V3 is input into the multiplexer 13 on the falling edge of each pulse input into the latch circuit 12.

Further, the control signals SEL1 to SEL3 are input sequentially from the sequencer 14 to the switches 13-1 to 13-3 constituting the multiplexer 13 in synchronization with the falling edges of pulses in the pulse train input into the latch circuit 12. Thus, the switches 13-1 to 13-3 are closed sequentially so that the voltage signals Vl, V2, V3 will be output from the multiplexer 13 to the A/D converter 15 in chronological order and converted by the A/D converter 15 to digital signals, respectively. The digital signals converted by the A/D converter 15 are written into the memory 16 under the control of the sequencer 14.

In the third embodiment, a pipeline type A/D converter capable of high-speed operation is used as the A/D converter 15. Unlike the conventional A/D converters performing the conversion of the next data after completion of conversion of the previous data, the pipeline type A/D converter converts input data to digital data sequentially at every clock cycle. In general, it takes several clocks to A/D-convert one data, and the converted data are processed from the highest order to the lowest order bit. If this processing is performed in parallel, not only can the input data be captured at every clock cycle, but also the digital data can be output at every clock cycle.

As described above, according to the third embodiment, analog data input from the output terminals of the AF sensor 1 are arranged in series order on one terminal through the multiplexer 13, and input into the A/D converter 15. The analog data input every clock cycle is converted by the A/D converter 15 to digital data at every clock cycle, achieving the following relationship:

(Sample Rate of *A/D* converter)=(Data Transfer Rate of *AF* sensor)×(Number of Output Terminals of *AF* sensor).

Further, according to the third embodiment, since the latch circuit 12 and the multiplexer 13 are provided on the side of the AF controller 11, rather than the side of the AF sensor 1, the circuit structure of the AF sensor 1 can be simplified.

Figure 3:
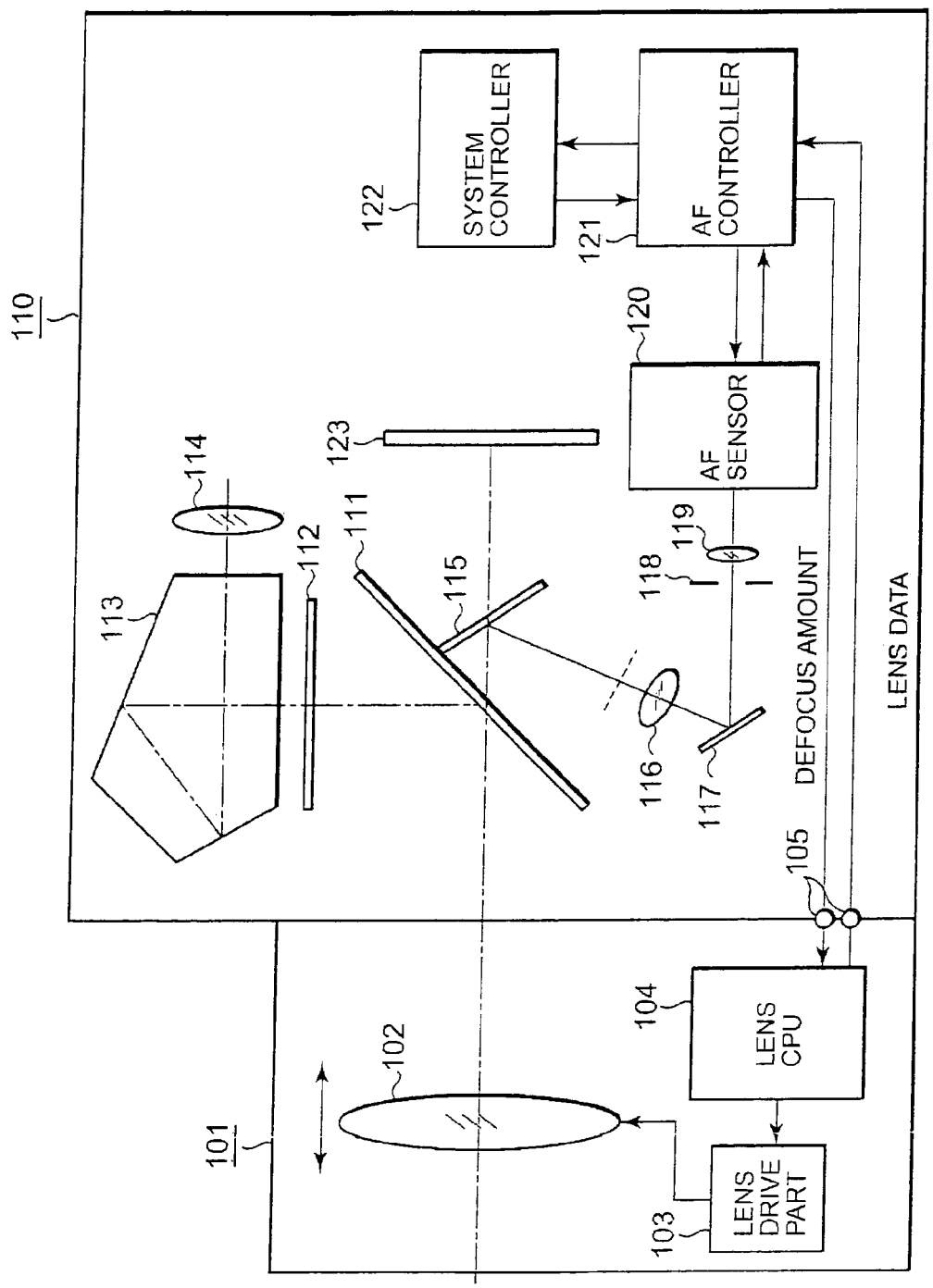
FIG. 3 is a schematic block diagram showing the structure of a series of components associated with focus-state detection in a camera having the focus detection device shown in FIG. 1.

The following more specifically describes the third embodiment of the present invention. FIG. 3 is a schematic block diagram showing the structure of a series of components associated with focus-state detection in a camera having the focus detection device shown in FIG. 1. FIG. 3 assumes a single-lens reflex camera with interchangeable lenses. In other words, the camera of FIG. 3 consists of an interchangeable lens 101 and a camera body 110.

The interchangeable lens 101 is removably mounted on the camera body 110 through a camera mount, not shown, provided on the front face of the camera body 110. A focus lens 102, a lens drive part 103, and a lens CPU 104 are provided inside the interchangeable lens 101.

The focus lens 102 is a lens for focus control included in a photographing optical system, and driven by a motor, not shown, in the lens drive part 103 along its optical axis (in the direction indicated by an arrow in FIG. 3). In the actual design, the photographing optical system consists of a plurality of lenses, but only the focus lens 102 is shown in FIG. 3 for simplicity of illustration. The lens drive part 103 consists of the motor and a drive circuit (motor driver). The lens CPU 104 is a control circuit for controlling the lens drive part 103 and the like. The lens CPU 104 is connected to an AF controller 121 through a communication connector 105 so that it can communicate with the AF controller 121. The lens CPU 104 communicates with the AF controller 121 to send the AF controller 121 lens data, such as production tolerance information and aberration information on the focus lens prestored in the lens CPU 104.

The camera body 110 has the following structure.

A main mirror 111 is rotatably provided in the camera body 110, with its central portion formed into a half-silvered mirror. When the main mirror 111 is at a down position (at the position as shown), part of light coming from a subject, not shown, and incident into the camera body 110 through the focus lens 102 in the interchangeable lens 101 is reflected by the main mirror 111. Then, the reflected light beam reaches an eyepiece 114 through a focusing screen 112 and pentaprism 113. This allows a photographer or camera operator to view the state of the subject, not shown.

The remaining part of light incident on the main mirror 111 passes through the half-silvered mirror portion. The light beam passing through the half-silvered mirror portion is reflected by a sub mirror 115 provided on the backside of the main mirror 111, and guided to an AF optical system for autofocus detection (AF). The AF optical system includes a condenser lens 116, a total reflection mirror 117, a separator aperture 118, and separator lenses 119.

Figure 4:
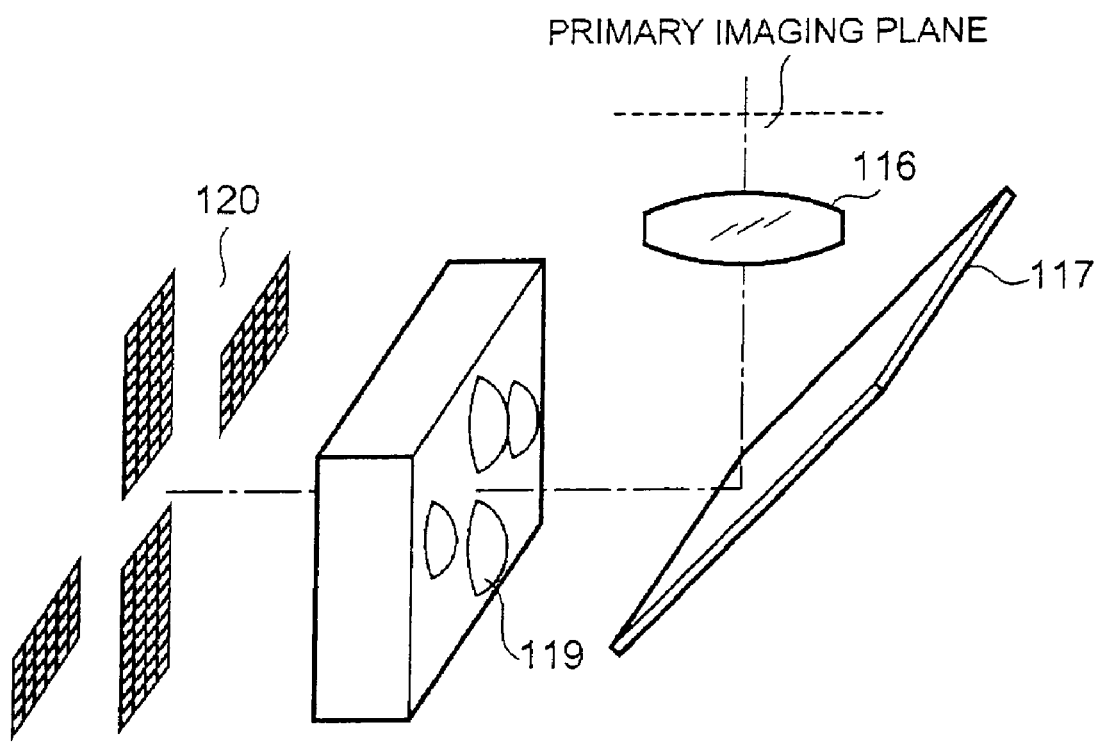
FIG. 4 is a schematic perspective view showing a secondary imaging system in an AF optical system used in the camera of FIG. 3.
Figure 5:
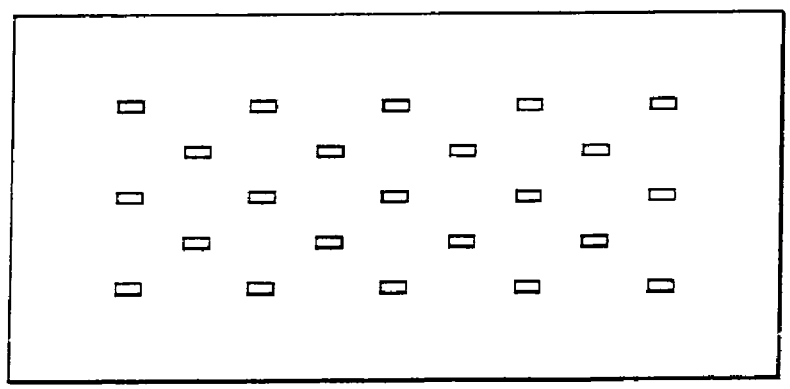
FIG. 5 is a schematic diagram showing the arrangement of focusing points of an AF sensor.

FIG. 4 is schematic perspective view showing a secondary imaging system in the AF optical system used in the camera of FIG. 3. The light beam reflected by the sub mirror 115 is formed on a primary imaging plane. The light beam of the subject image formed on the primary imaging plane is condensed by the condenser lens 116, reflected by the total reflection mirror 117, and pupil-split by the separator aperture, not shown. The light beams of the subject image pupil-split by the separator aperture are condensed by the separator lenses 119, and projected to predetermined areas of an AF sensor 120 arranged behind the AF optical system, respectively. In this case, it is assumed that the AF sensor 120 can detect focus sates at multiple points on the focusing screen 112 as shown in FIG. 5 corresponding to those in the viewfinder. The details of the AF sensor 120 will be described later.

In the AF sensor 120, the light beams from the subject are photoelectrically converted to analog electric signals. The outputs of the AF sensor 120 are input into the AF controller 121 to calculate defocus amount. The operation of the AF controller 121 is controlled by a system controller 122.

The defocus amount calculated by the AF controller 121 is sent to the lens CPU 104 through the communication connector 105. Based on the defocus amount sent from the AF controller 121, the lens CPU 104 calculates the amount of driving the motor to drivethe focus lens 102. Then, based on the amount of driving the motor, the focus lens 102 is driven through the lens drive part 103 to the in-focus position.

Further, in FIG. 3, when the main mirror 111 is at an up-position, where it is withdrawn out of the optical path of the focus lens 102, the light beam coming from the subject and incident into the camera body 110 through focus lens 102 is formed on an image pickup device 123, and photoelectrically converted. The signal thus obtained is input to the system controller 122, and subjected to predetermined image processing.

Figure 6:
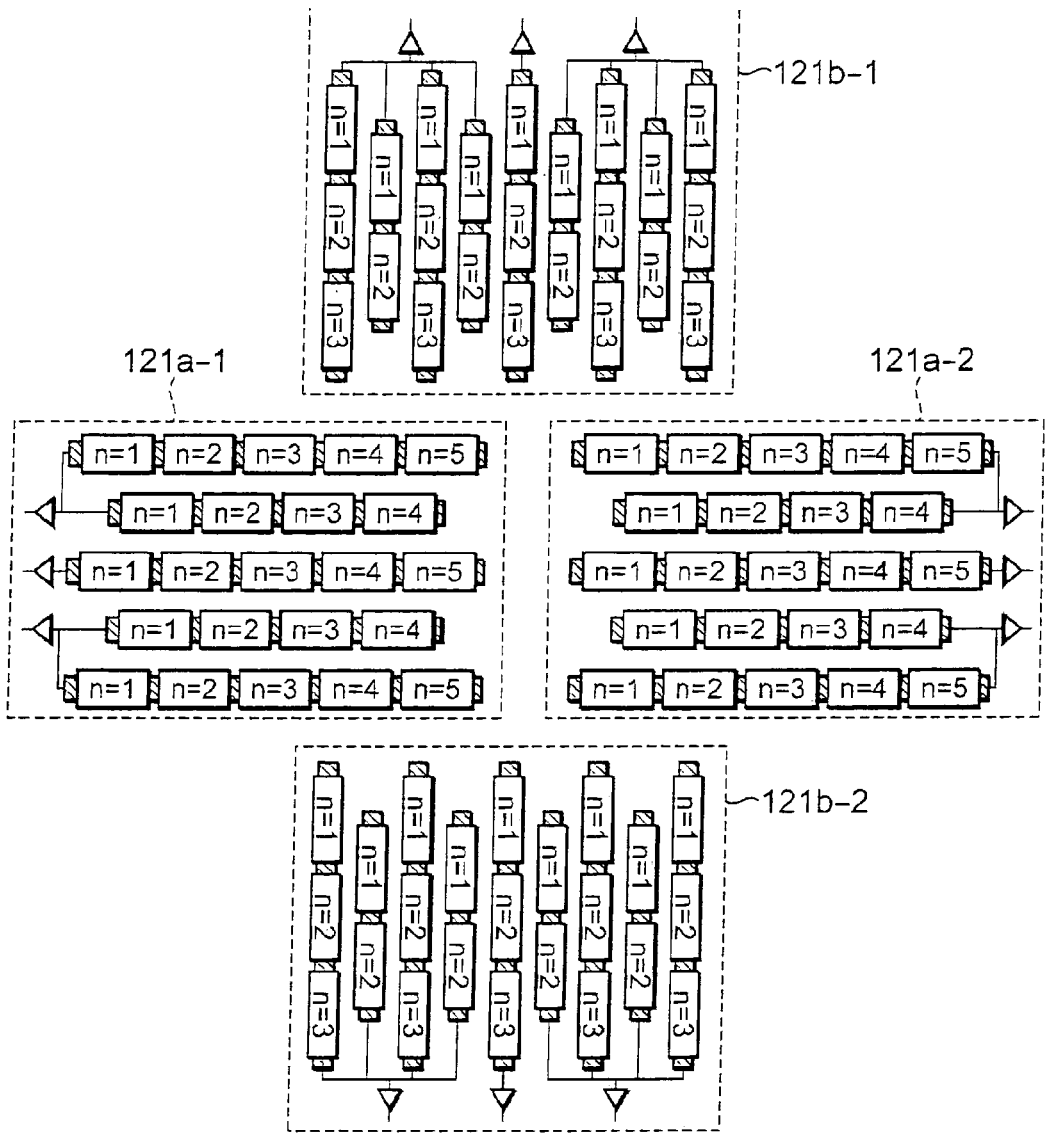
FIG. 6 is a diagram showing the sensor arrangement for detecting focus states at 23 points as shown in FIG. 5.

The following describes the AF sensor. FIG. 6 is a diagram showing the sensor arrangement for detecting focus states at 23 points as shown in FIG. 5.

The AF sensor shown in FIG. 6 consists of a horizontal standard line-sensor group 121a-1 and a horizontal reference line-sensor group 121a-2 arranged along the horizontal direction of the imaging plane, and a vertical standard line-sensor group 121b-1 and a vertical reference line-sensor group 121b-2 arranged along the vertical direction of the imaging plane. The horizontal standard line-sensor group 121a-1 pairs off with the horizontal reference line-sensor group 121a-2, while the vertical standard line-sensor group 121b-1 pairs off with the vertical reference line-sensor group 121b-2. Defocus amount is calculated in each pair of the sensor groups in a manner described later. This structure enables the detection of all the focus states at the 23 points shown in FIG. 5 using the two pairs of horizontal line-sensor groups and vertical line-sensor groups, thereby improving the accuracy of focus detection.

The output parts of each pair of sensor groups are configured opposite to each other. In other words, as shown in FIG. 6, data from the rows of pixels on the standard side are output sequentially to the side opposite to the side on which the pixel rows on the reference side are arranged, that is, where there are no pixel rows on the reference side. Similarly, data from the rows of pixels on the reference side are output sequentially to the side opposite to the side on which the pixel rows on the standard side are arranged.

Each of the horizontal standard line-sensor group 121a-1 and the horizontal reference line-sensor group 121a-2 consists of five rows of 23 horizontal pixels made up of line sensors each having five pixels and line sensors each having four pixels arranged alternately with each other. On the other hand, each of the vertical standard line-sensor group 121b-1 and the vertical reference line-sensor group 121b-2 consists of nine rows of 23 vertical pixels made up of line sensors each having three pixels and line sensors each having two pixels arranged alternately with each other.

Figure 7:
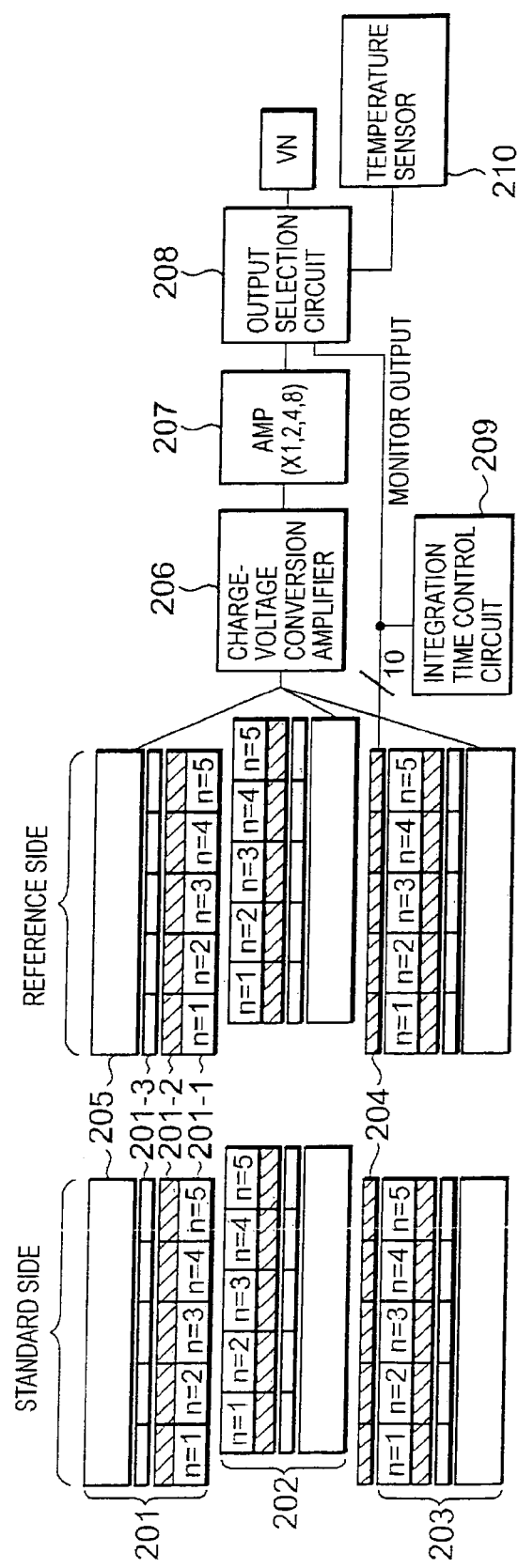
FIG. 7 is a block diagram of a sensor circuit structure partially showing a horizontal standard line-sensor group and a horizontal reference line-sensor group shown in FIG. 6.

FIG. 7 is a block diagram of a sensor circuit structure partially showing the horizontal standard line-sensor group 121a-1 and the horizontal reference line-sensor group 121a-2 shown in FIG. 6 (part of line sensors each having five pixels). Here, n shown in FIG. 7 corresponds to n in FIG. 6. The circuit structure of the line sensors in FIG. 6 are the same as that partially shown in FIG. 7 except that the number of pixels in the second row in FIG. 7 is different from that in FIG. 6.

In the embodiment, as shown in FIG. 7, three line sensors 201-203 are arranged in a zigzag pattern as a unit of pixel rows. In other words, the line sensor 202 in the three line sensors is offset by one-half pixel from the other line sensors. Since the three line sensors are thus arranged in the zigzag pattern, the accuracy of focus detection can be improved. Further, as shown in FIG. 7, a row of monitoring photodiodes 204 is arranged between the line sensor 202 and the line sensor 203.

Further, in FIG. 7, each pixel row consists of a plurality of photodiodes 201-1 each constituting a pixel. Photoelectric charge is generated in each of the plurality of photodiodes 201-1 depending on the amount of light of the subject incident on the photodiode. The photoelectric charge generated in each of the photodiodes 201-1 is accumulated in an electric charge accumulating part 201-1.

The amount of electric charge accumulation in the electric charge accumulating part 201-2 is monitored in the monitoring photodiode row 204. The output of the row of monitoring photodiodes 204 is sent to an integration time control circuit 209. The integration time control circuit 209 determines whether the output of the row of monitoring photodiodes 204 becomes equal to or larger than a predetermined threshold. If the output of the row of monitoring photodiodes 204 becomes equal to or larger than the threshold, the electric charge accumulation (integration operation) is completed. Even if the output of the row of monitoring photodiodes 204 is not equal to or larger than the threshold, the electric charge accumulation is completed as soon as a predetermined integration time has passed. The threshold and the integration time for completing the electric charge accumulation can be changed.

After the completion of the electric charge accumulation, a transfer switch part 201-3 connected downstream of the electric charge accumulating part 201-2 is closed to transfer the photoelectric charge accumulated in the electric charge accumulating part 201-2 to the charge transfer channel 205.

The photoelectric charge is then transferred from the charge transfer channel 205 to a charge-voltage conversion amplifier 206 pixel by pixel each time a shift pulse is applied to the charge transfer channel 205, and converted to a voltage signal by the charge-voltage conversion amplifier 206. Each voltage signal converted by the charge-voltage conversion amplifier 206 is amplified at an amplifier (abbreviated as AMP in FIG. 7) 207 by a predetermined amplification factor (e.g., selectable among x1, x2, x4, and x8), and input into an output selection circuit 208.

In the output selection circuit 208, the voltage signal input pixel by pixel is temperature-compensated based on the temperature detected by a temperature sensor 210. The output voltage VN thus obtained is sent to the downstream AF controller 121.

Figure 8:
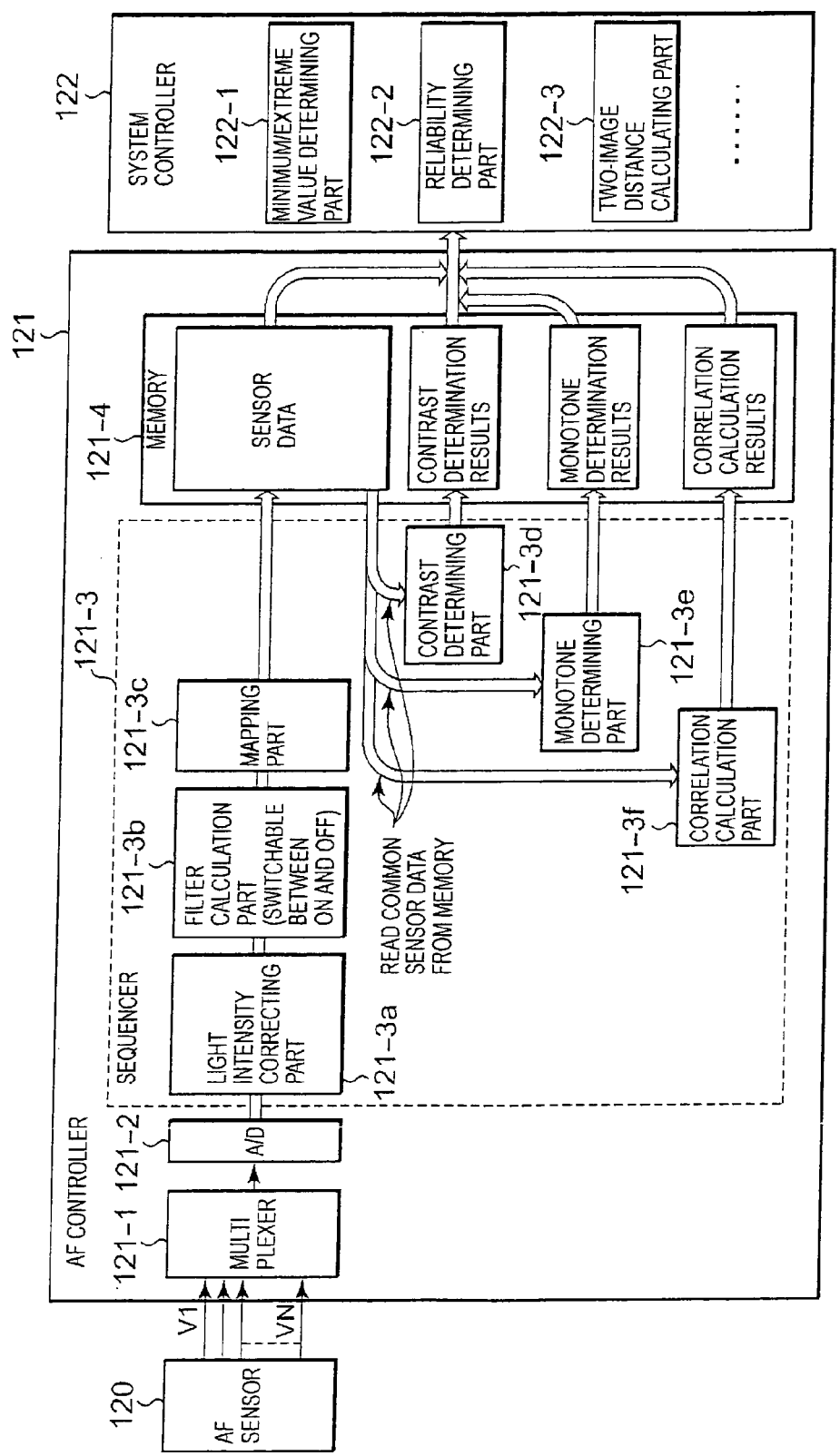
FIG. 8 is a block diagram showing the details of the AF sensor, an AF controller, and a system controller.

The following describes how the AF controller calculates defocus amount. FIG. 8 is a block diagram showing the details of the AF sensor, the AF controller, and the system controller involved in calculating the defocus amount.

Analog data (voltage signals) V1 to VN output in parallel from the output terminals of the AF sensor 120 are arranged in series order on the one terminal by a multiplexer 121-1 in the AF controller 121, and converted by an A/D converter 121-2 sequentially to digital data (sensor data). For example, in the case of FIG. 6, since the number of output terminals is 12, N is equal to 12. In this case, the number of switches constituting the multiplexer is also 12.

The sensor data obtained by the A/D converter 121-2 are input sequentially into a light intensity correcting part 121-3a in a sequencer 121-3. In the light intensity correcting part 121-3a, variations in the output of photodiodes constituting each line sensor and variations in the light intensity of sensor data due to insufficient light at the periphery caused depending on the optical system are corrected based on predetermined correction data. The correction data is used to correct the variations of sensor data, for example, at the time of flat field observation.

The sensor data corrected by the light intensity correcting part 121-3a are input into a filter calculation part 121-3b. The filter calculation part 121-3b performs filter calculations such as edge-enhancement processing and the like on the sensor data. These filter calculations performed by the filter calculation part 121-3b can be omitted.

The sensor data output from the filter calculation part 121-3b are input into a mapping part 121-3c. In the mapping part 121-3c, the sensor data arranged in series order on the one terminal through the multiplexer 121-1 are rearranged in ascending numeric order of pixel rows, and stored in a memory (RAIMI) 121-4. The order of pixel rows varies depending on whether zigzag calculation is used or not to calculate the distance between two images to be described later.

The sensor data stored in the memory 121-4 are read by a contrast determining (evaluation) part 121-3d, a monotone determining (evaluation) part 121-3e, and a correlation calculation part 121-3f in the sequencer 121-3. The contrast determining part 121-3d evaluates from the sensor data whether the contrast of the subject is equal to or higher than a predetermined level. The monotone determination part 121-3e evaluates whether the subject is monotonous (such as a repeated pattern) or not. The correlation calculation part 121-3f calculates the amount of correlation between the sensor data from the standard side and the sensor data from the reference side in a manner described later. The result of contrast determination from the contrast evaluation part 121-3d, the result of monotone evaluation from the monotone determination part 121-3e, and the result of correlation calculation from the correlation calculation part 121-3f are all stored in the memory 121-4.

The sensor data, the contrast evaluation result, the monotonous evaluation result, and the correlation calculation result, all stored in the memory 121-4, are input into the system controller 122. In the system controller 122, a minimum/extreme value determining part 122-1 determines shift amount exhibiting the maximum correlation, that is, the shift amount for which the correlation value is the smallest among the values calculated by the correlation calculation part 121-3f. A reliability determining part 122-2 determines the reliability of the determination result from the minimum/extreme value determining part 122-1 based on the contrast evaluation result from the contrast evaluation part 121-3d, the monotone evaluation result from the monotone evaluation part 121-3e, and the correlation calculation result from the correlation calculation part 121-3f. A two-image distance calculating part 122-3 calculates the distance between two images to determine defocus amount based on the determination result from the minimum/extreme value determining part 122-1.

Next, a technique for calculating the defocus amount is described.

First, the correlation calculation part 121-3f performs correlation calculations. The correlation calculations are made by dividing each row of pixels into a plurality of correlation calculation frames. FIGS. 9A and 9B are schematic diagrams of how to divide each pixel row into correlation calculation frames. FIG. 9A shows how to divide each pixel row in the horizontal sensor group, and FIG. 9B shows how to divide each pixel row in the vertical sensor group. In the example of FIGS. 9A and 9B, one pixel row is divided into three correlation calculation frames, namely a center correlation calculation frame 301, a right correlation calculation frame 302, and a left correlation calculation frame 303. The reason why correlation calculations are performed on these divided correlation calculation frames is that the correlation calculations can be correctly performed even if a light beam of a mixture of near and far subjects is incident in one pixel row.

Further, in the embodiment, each row of pixels can be considered that the three line sensors 201 to 203 are arranged in the zigzag pattern as mentioned above. In this case, adjacent two lines (line sensors 201 and 202 or line sensors 202 and 203) are considered as a pair.

When light beams from the same part of a subject are projected in the same kind of correlation calculation frames in a pair of line sensors, the pair of line sensors can be considered as a single line sensor. In this case, sensor data are read alternately on a pixel-by-pixel basis to perform correlation calculations on the sensor data. This calculation technique is called zigzag calculation below.

FIG. 10 is a diagram showing the concept of the order of reading sensor data to perform zigzag calculation. In the zigzag calculation, the line sensors 201 and the line sensor 202 are considered as a single line sensor, and sensor data are read alternately on a pixel-by-pixel basis. In the example of FIG. 10, pixel 1, pixel 2, pixel 4, pixel 5, . . . , pixel 11, pixel 13, pixel 14, . . . are read in this order. After completion of reading all sensor data from the pair of line sensors 201 and 202, the line sensor 202 and the line sensor 203 are next considered as a single line sensor, and sensor data are read alternately on a pixel-by-pixel basis. In the example of FIG. 10, pixel 3, pixel 2, pixel 6, pixel 5, . . . , pixel 11, pixel 15, pixel 14, . . . are read in this order.

In the embodiment, the sensor data arranged in series order on the one terminal through the multiplexer 121-1 are rearranged through the mapping part 121-3c in the order shown in FIG. 10 so that the sensor data will be read in the ascending numeric order of pixel rows. Then the reordered sensor data are stored in the memory 121-4. FIG. 11 is a table showing the location of sensor data in the memory 121-4 at the time of zigzag calculation. In general, the operation of the A/D converter 121-2 is slower than the calculation parts downstream of the A/D converter 121-2. Therefore, the sensor data are reordered during the execution of A/D conversion so that the load of the downstream calculation processing can be reduced. In addition, since the light intensity correction and filter calculation can be performed on a pixel basis, they are performed prior to reordering of the sensor data performed by the mapping part 121-3c.

On the other hand, when light beams from the same part of a subject are not projected in the same kind of correlation calculation frames in a pair of line sensors, the line sensors can not be considered as a single line sensor. In this case, the line sensor 201 and the line sensor 203 are read as different line sensors. In the example of FIG. 10, pixel 1, pixel 4, pixel 7, pixel 10, pixel 13, . . . are read from the line senor 201 in this order. After that, the sensor data of the line sensor 202 and the line sensor 203 are read in the same manner. FIG. 12 is a table showing the location of sensor data in the memory 121-4 at the time of nonzigzag calculation.

Figure 13:
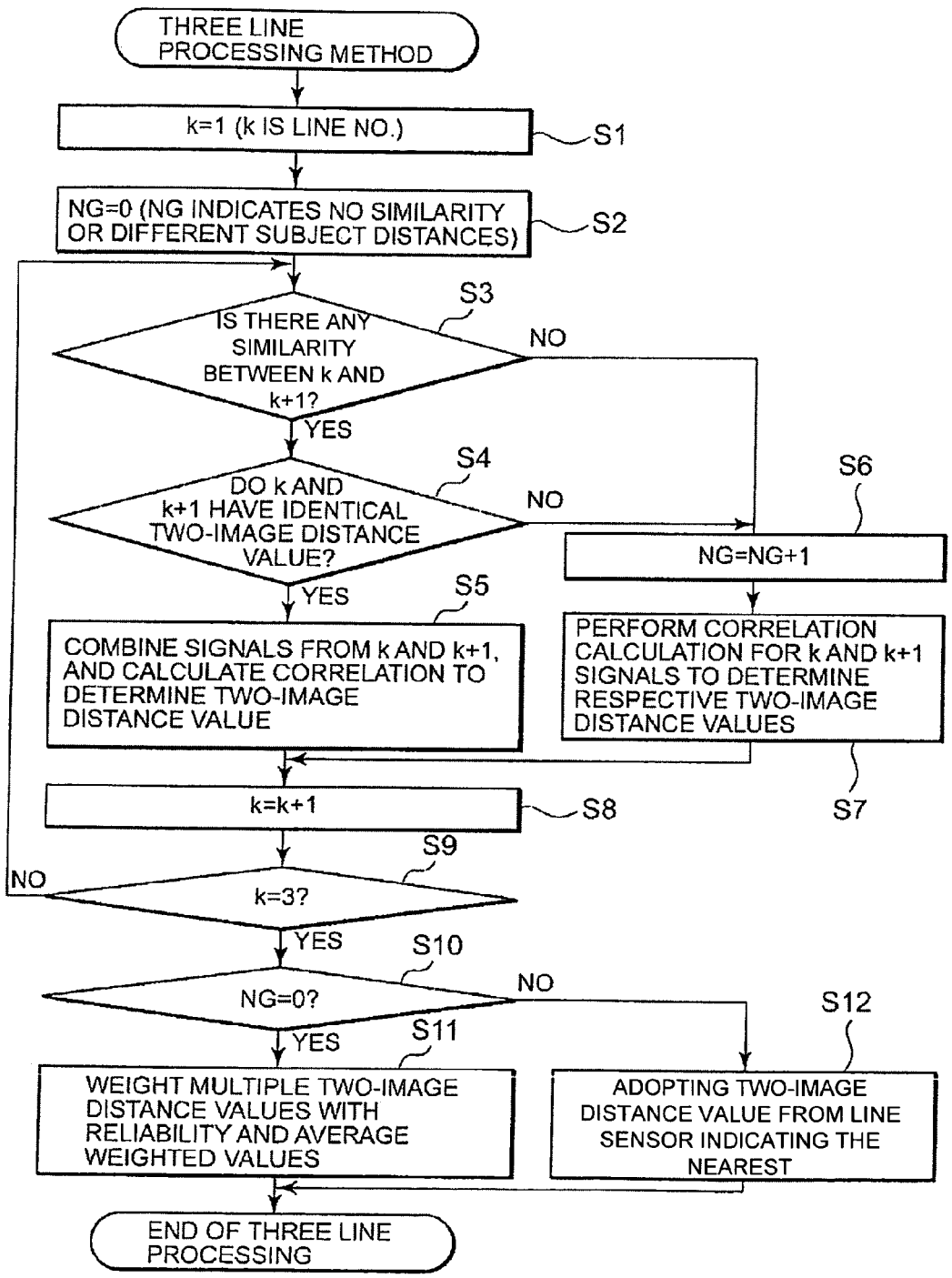
FIG. 13 is a flowchart showing a procedure for processing sensor data of line sensors arranged in a zigzag pattern.

FIG. 13 is a flowchart showing a procedure for processing sensor data of line sensors arranged in the zigzag pattern. This processing is performed inside the AF controller 121 and the system controller 122.

In the processing of FIG. 13, 1 is set for parameter k representing the line number of three line sensors corresponding to the n-th row of pixels in FIG. 6 (step S1) In other words, the parameter k takes on values 1 to 3, and in the embodiment, k=1 corresponds to the line sensor 201, k=2 corresponds to the line sensor 202, and k=3 corresponds to the line sensor 203, respectively.

After k=1 is set, parameter NG indicating whether there is any similarity between two images, or whether the distances from the subject are different from each other is reset to 0 (step S2). Then, it is determined whether sensor data of adjacent two line sensors (k-th line sensor and k+1-th line sensor, which correspond to the line sensor 201 and the line sensor 202 in the first round) have any similarity to each other (step S3). The determination on the similarity is made by performing correlation calculations between the pair of adjacent line sensors for each correlation calculation frame to determine the reliability of the maximum correlation value based on the results of the correlation calculations. The correlation calculations are performed according to the following equation 7):

Correlation Value $F(k, k+1)=\Sigma|D_k(i)-D_{k+1}(i)|$      7)

In this equation, the maximum value of correlation values F has only to be determined in a shift range of −4 to +4. Note that $D_k(i)$ in the equation 7) denotes sensor data of k-th line sensor and $D_{k+1}(i)$ denotes sensor data of k+1-th line sensor.

Figure 14A:
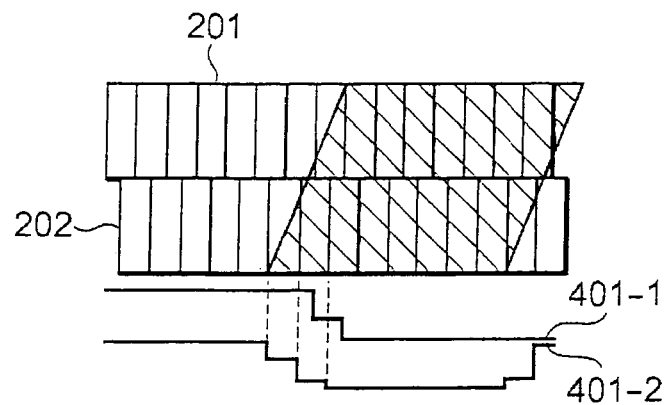
FIGS. 14A an 14B are a series of diagrams to explain correlation calculation.
Figure 14B:
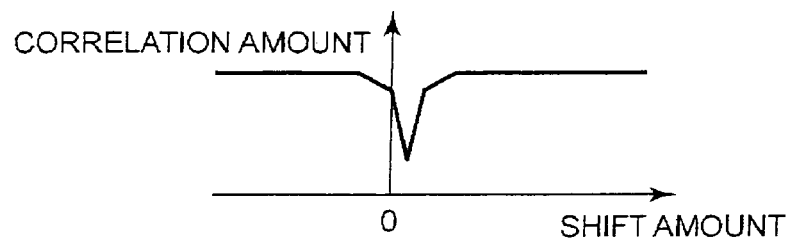

For example, if the sensor data of the k-th line sensor is the sensor data as indicated by reference numeral 401-1 in FIG. 14A and the sensor data of the k+1-the line sensor is the sensor data as indicated by reference numeral 401-2 in FIG. 14A, the correlation value F calculated in the equation 7) in the case that the shift amount is +1 becomes the minimum. At this point, the correlation amount shown in FIG. 14B becomes largest.

The reliability is determined based on the contrast evaluation result from the contrast determining part 121-3d, the monotone evaluation result from the monotone determination part 121-3e, and the minimum value obtained from the equation 7). In other words, if the subject has a high contrast, and is not a repeated pattern, and the minimum value obtained from the equation 7) is smaller than the predetermined threshold, it is determined that the final result is highly reliable and there are similarities between sensor data of the pair of adjacent line sensors.

In the determination in step S3, if there is any similarity between the sensor data of the pair of adjacent line sensors, the procedure proceeds from step S3 to step S4. In step S4, it is determined whether the two-image distance values obtained from the sensor data of the pair of adjacent lines sensors are identical to each other (step S4) To this end, twoimage distance values are calculated from the k-th line sensor and the kth line senor, separately. Each twoimage distance value can be determined from the shift amount by which the maximum correlation can be obtained when correlation calculation similar to the equation 1) is performed between the standard-side pixel row and the reference-side pixel row. Here, Correlation Value $F(k)=\Sigma|DL(i)-DR(i)|$      8)

In other words, a shift amount by which the maximum correlation can be obtained in the equation 8) (a shift amount by which the correlation value F in the equation 8) becomes minimum) has only to be determined. Note that the equation 8) assumes that the range of shift amounts falls within each correlation calculation frame. Further, in the equation 8), DL(i) denotes sensor data of a standard-side pixel row and DR(i) denotes sensor data of a reference-side pixel row.

After completion of determining the two-image distance value for each line sensor, it is then determined whether the two-image distance value obtained from k-th line sensor and the two-image distance value obtained from k+1-th line sensor are identical. This determination is made as follows: An average value between the two-image distance value obtained from the k-th line sensor and the two-image distance value obtained from the k+1-th line sensor is calculated to determine whether the difference between the average value and the two-image distance value determined for each line sensor is smaller than a predetermined threshold.

Figure 15:
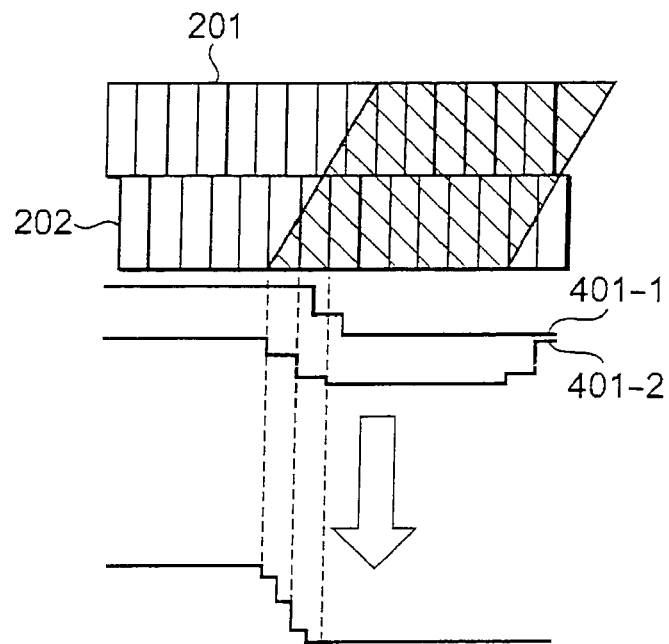
FIG. 15 is a diagram to explain how to combine sensor data.

If it is determined in step S4 that the two-image distance values are identical, the procedure proceeds from step S4 to step S5. Then, the sensor data of the k-th line sensor and the sensor data of the k+1-th line sensor are combined, and correlation calculation between the standard side and the reference side is performed to calculate a combined two-image distance value (step S5). The sensor data are combined by shifting one sensor data as shown in FIG. 15 by a shift amount obtained from the similarity determination in step S3. Since the sensor data are combined this way, the nominal pixel pitch can be made one-half, of that before the combination. It is preferable that reliability be determined after the correlation calculation in the same manner as in step S3.

On the other hand, if it is determined in step S3 that the sensor data of the pair of adjacent line sensors have no similarity, or if it is determined in step 4 that the two-image distance values obtained from the pair of adjacent line sensors are not identical, the procedure branches to step S6, in which 1 is added to NG (step S6). Then, two-image distance values are calculated for the k-th line sensor and the k+1-th line sensor, respectively, in the same manner as in the determination step S4 (step S7). In this case, it is also preferable that reliability be determined after the correlation calculation in the same manner as in step S3. Note that the predetermined threshold used for the reliability determination in step S7 is set smaller than the predetermined threshold used in the reliability determination step S3.

Following the above-mentioned processing, 1 is added to k (step S8), and it is determined whether k is 3, that is, whether processing for all lines is completed (step S9) If it is determined in step S9 that k is not 3, the procedure returns to step 53 to perform the processing steps S3 to 57 on the next pair of adjacent line sensors (that is, the line sensor 202 and the line sensor 203) On the other hand, it is determined in step S9 that k is 3, the procedure proceeds from step S9 to step S10 to determine whether NG is 0 (step Sl0)

If it is determined in step Sl0 that NG is 0, it means a case where the zigzag calculation is performed on both the pair of line sensor 201 and line sensor 202 and the pair of line sensor 202 and line sensor 203. In this case, two values of combined twoimage distances determined in two calculation steps are weighted according to reliability and averaged to obtain a final two-image distance value (step Sl1). In other words, the following calculation is performed:

Final two-image distance value=(Combined two-image distance value (1,2)×Reliability (1,2) +Combined two-image distance value (2,3)×Reliability (2,3))/(Reliability (1,2)+Reliability (2,3))  (9)

In Step S11, the two values of combined two-image distances can simply be averaged instead of the weighting averaging operation. The system controller 122 decides on whether to perform the weighting averaging operation or to perform the simple averaging operation.

Thus, the sensor data of the pair of line sensors are combined to determine a combined two-image distance value, and two values of combined two-image distances are averaged. This can realize a doubling of improvement in accuracy, compared with a case where the two-image distance value is determined from a single line alone.

On the other hand, if it is determined in step S10 that NG is not 0, it means a case where the zigzag calculation is not performed on at least either the pair of line sensor 201 and line sensor 202 or the pair of line sensor 202 and line sensor 203. In this case, a two-image distance value determined from one of the line sensor 201 to line sensor 203, on which a light beam from the nearest subject is incident, is determined as the final two-image distance value (step S12).

Thus, the final two-image distance value can be determined through the above-mentioned processing. After completion of determining the final two-image distance value, defocus amount is calculated.

In calculating defocus amount, a correlation calculation frame is first selected. In the process of selecting a correlation calculation frame, higher priority is given to correlation calculation frames in which the two-image distance value is highly reliable and two or more line sensors receive light from the same subject. The selection of such a correlation calculation frame makes possible more accurate focus-state detection.

After completion of selecting a correlation calculation frame, a focusing point is selected. The selection of a focusing point is performed according to the state of a focusing point selection mode. For example, the focusing-point selection mode is a single point mode, a two-image distance value for a single point selected by a photographer (or camera operator) is used. On the other hand, if the focusing-point selection mode is a multi-point mode, multiple focusing points from which reliable sensor data are output are selected from all focusing points, and the nearest focusing point is selected from the multiple focusing points selected so that the two-image distance value at this focusing point will be used to calculate defocus amount. If there are two or more two-image distance values substantially the same as that at the nearest focusing point selected, the images at these focusing points are considered as the images of an identical subject. Therefore, the two-image distance values at these focusing points having substantially the same two-image distance value are averaged, and the average value is used to calculate defocus amount.

Defocus amount is calculated from the two-image distance value obtained as a result of selection of a focusing point(s) using a defocus coefficient optically calculated. The defocus amount thus obtained is corrected for defocus errors due to variations in body parts at the time of manufacture, variations in focus lens parts at the time of manufacture, etc. to calculate final defocus amount.

After completion of calculating the final defocus amount, the defocus amount is transmitted to the lens CPU 104. Based on the defocus amount transmitted, the lens CPU 104 controls the lens drive part 103 to drive the focus lens 102 to the in-focus position.

The electric circuit structure of a camera equipped with a focus detection device according to one preferred embodiment is described below with reference to FIG. 16.

Figure 16:
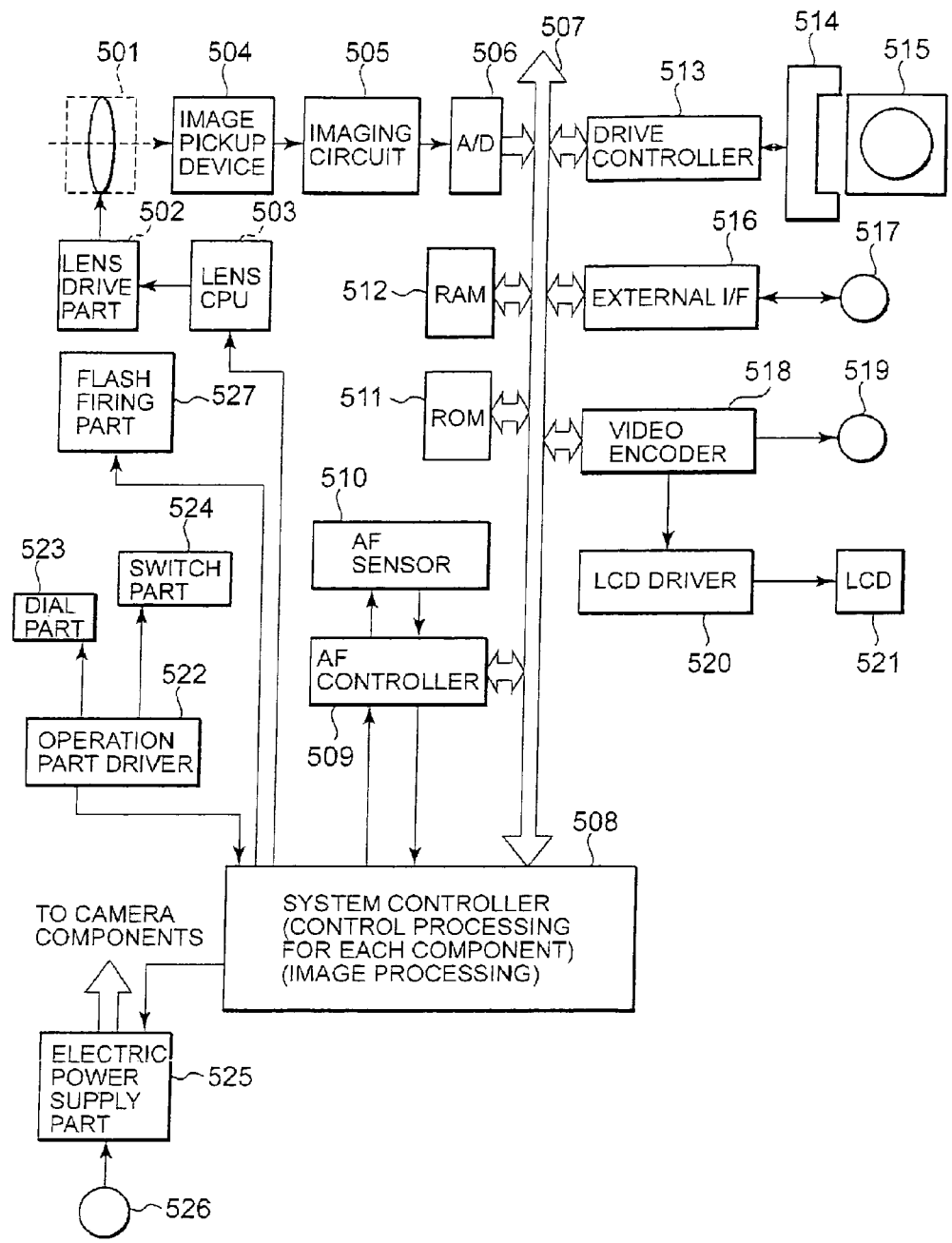
FIG. 16 is a block diagram showing the general electric circuit structure of the camera having a focus detection device according to one preferred embodiment of the present invention.

FIG. 16 is a block diagram showing the general electric circuit structure of the camera having a focus detection device according to the preferred embodiment. Note that the block diagram of FIG. 16 shows the general electric circuit structure of the camera without showing the distinction between the interchangeable lens and the camera body.

In FIG. 16, a zoom lens system 501 including the focus lens is arranged in position in the camera. The zoom lens system 501 is a photographing optical system including the focus lens, which is represented in FIG. 16 by a single lens for simplicity of illustration. The zoom lens system 501 is driven by a lens drive part 502. The lens drive part 502 is controlled by a lens CPU 503.

An image pickup device 504 such as a CCD is arranged on the optical path of light projected through the zoom lens system 501. The image pickup device 504 is connected to a bus line 507 through an imaging circuit 505 and an A/D converter 506. A system controller 508 and an AF controller 509 are also connected to the bus line 507. An AF sensor 510 is connected to the AF controller 509. A ROM 511 storing various control programs and information for data processing, a RAM 512 for temporary storage of data, and a drive controller 513 are further connected to the bus line 507. The drive controller 513 is connected to a disk- or card-type recording medium 515 through a media drive 514. Further connected to the bus line 507 are an output terminal 517 through an external I/F part 516, an video output terminal 519 through a video encoder 518, and an LCD display part 521 through an LCD driver 520.

The system controller 508 controls the entire operation of the camera. The lens CPU 503 is connected to the system controller 508 so that they can communicate with each other. Also connected to the system controller 508 are a dial part 523 and a switch part 524 through an operation part driver 522, and an electric power supply 525 for supplying power to each camera component. The dial part 523 and the switch part 524 detect the states of operation parts through which instructions to the camera, such as mode setting commands, are input.

The electric power supply 525 is equipped with an external power input terminal 526 for receiving power from the outside. Further connected to the system controller 508 is a flash firing part 527 for firing flash.

In this structure, when the sensor output of the AF sensor 510 is input into the AF controller 509, the AF controller 509 performs the above-mentioned various calculations to determine defocus amount. Then, based on the defocus amount determined, the lens drive part 502 is controlled through the lens CPU 503 to control the drive of the focus lens in the zoom lens system 501 to the in-focus position.

Further, when a subject image, not shown, is formed on the image pickup device 504 through the zoom lens system 501, the subject image is photoelectrically converted and output from the image pickup device 504 as an image pickup signal. The image pickup signal is processed through the imaging circuit 505 located downstream of the image pickup device 504, and converted by the A/D converter 506 to digital image data. The digital image data is input into the system controller 508 through the bus line 507. The system controller 508 performs various signal processing on the input data such as JPEG compression/decompression processing. The RAM 512 temporarily stores various data, such as data subjected to signal processing through the system controller 508, and data used in AF calculation processing performed by the AF controller 509.

Further, when a disk- or card-type recording medium 515 for storage of image data is loaded into the media drive 514, image data is recorded on or read from the recording medium 515. The operation of the media drive 514 is controlled by the drive controller 513. When image data is read from the recording medium 515, the read image data is sent to the system controller 508 through the bus line 507, and is subjected to signal processing in the same manner as mentioned above.

Further, a peripheral device such as a personal computer is connected to the bus line 507 through an external I/O terminal (e.g., a USB terminal) 517 and the external I/F part 516. Image data and the like stored in the peripheral device are captured through the external I/O terminal 517 and the external I/F part 516. Then, the media drive 514 is driven under the control of the drive controller 513 to record the captured image data and the like on the recording medium 515.

Furthermore, the video encoder 518 encodes the image signal A/D converted by the A/D converter 506, or the image signal read from the recording medium 515 and subjected to JPEG decompression through the system controller 508 so that the encoded image signal will be displayed on the LCD display part 521 in a predetermined manner. The LCD display part 521 is driven by the LCD driver 520. In addition, this camera can output picture signals to the outside through the video output terminal 519.

As described above, according to the third embodiment, plural pieces of analog data output in parallel from the AF sensor are arranged in series order on the one terminal through the multiplexer and sequentially converted by the A/D converter to digital data. This allows the one-channel A/D converter to achieve a high sampling rate while keeping the data rate of the focus detection sensor low in consideration of noise performance and power consumption.

Further, since the sensor data arranged in series order on the one terminal are stored in the memory after being arranged in a different order to suit the downstream calculation processing, the load of the downstream calculation processing can be reduced.

While there has been shown and described what are considered to be a preferred embodiment of the invention, it will, of course, be understood that various modifications and changes in form or detail could readily be made without departing from the spirit of the invention. For example, the number of line sensors used in the zigzag calculation is three in the aforementioned third embodiment, but the number can be more than three.

It is therefore intended that the invention not be limited to the exact forms described and illustrated, but constructed to cover all modifications that may fall within the scope of the appended claims.

What is claimed is:

1. A focus detection device comprising:
   a focus detection sensor having a plurality of rows of pixels for photoelectrically converting a subject image and detecting focus states at a plurality of focusing points in the field of a viewfinder;
   a plurality of output terminals for outputting analog data obtained by the row of pixels in order of the rows of pixels;
   sequencer for generating control signals which synchronize with output timing of the analog data;
   a multiplexer for arranging and outputting, in series order on the one terminal, the analog data output in parallel from the plurality of output terminals of the focus detection sensor by the control signals; and
   an A/D converter for converting, to digital data, the analog data arranged in series order on the one terminal through and output from the multiplexer.

2. The device according to claim 1, wherein the sampling rate of the A/D converter is equal to a value N-times (where N is an integer of 2 or more) the data rate at one output terminal of the focus detection sensor.

3. The device according to claim 2, wherein N is equal to the number of output terminals of the focus detection sensor.

4. The device according to claim 1 further comprising a latch circuit, arranged between the plurality of output terminals of the focus detection sensor and the multiplexer, for holding, at constant intervals, analog data output in parallel from the plurality of output terminals of the focus detection sensor.

5. The device according to claim 4, wherein the focus detection device consists of two chips:
   one chip for the focus detection sensor, and
   the other chip including at least the latch circuit, the multiplexer, and the A/D converter.

6. The device according to claim 4, wherein the constant intervals is the timings each synchronized with the cycle of outputting analog data from the plurality of output terminals of the focus detection sensor.

7. The device according to claim 1, wherein the A/D converter is a pipeline type A/D converter.

8. The device according to claim 1, wherein
   the focus detection sensor is a phase-contrast focus detection sensor consisting of a plurality of standard-side pixel rows and a plurality of reference-side pixel rows corresponding to the standard-side pixel rows, and
   the focus detection device further comprises a memory for storing, in order of pixel rows, digital data output from the plurality of standard-side pixel rows and converted by the A/D converter, and digital data output from the plurality of reference-side pixel rows and converted by the A/D converter.

9. The device according to claim 8 wherein
   the plurality of standard-side pixel rows and the plurality of reference-side pixel rows are made up by arranging a plurality of line sensors in a zigzag pattern, respectively, and the order of pixel rows is changed between the order of pixel rows when the plurality of line sensors arranged in the zigzag pattern is divided into plural pairs and each pair of line sensors are considered as a single line sensor, and the order or pixel rows when the plurality of line sensors arranged in the zigzag pattern are considered as different line sensors.

10. The device according to claim 8, further comprising memory control means for rearranging digital data converted by the A/D converter in order of pixel rows of the focus detection sensor and storing the rearranged digital data in the memory.

11. The device according to claim 8, wherein the memory is a SRAM, and the digital data converted by the A/D converter are stored in the memory after being rearranged in order of pixel rows of the focus detection sensor.

12. The device according to claim 8, further comprising means for deleting unnecessary data contained in the digital data converted by the A/D converter before being stored in the memory.

13. The device according to chin 8, wherein the outputs of the plurality of standard-side pixel rows are output sequentially to the side opposite to the side on which the plurality of reference-side pixel rows are arranged.

14. The device according to claim 1, wherein the timing of outputting the analog data in parallel is controlled to output analog data, corresponding to at least necessary focusing points selected from a plurality of focusing points, at the same time from the plurality of output terminals.

15. A focus detection device comprising:
   a plurality of focus detection portions for detecting two subject images passing through different optical paths substantially in the vertical direction of a main optical system and two subject images passing through different optical paths substantially in the horizontal direction of the main optical system;
   a multiplexer for reading the outputs of the plurality of focus detection portions to output them selectively; and
   a controller for controlling the operation of only designated focus detection portions while controlling the multiplexer to arrange, in series order on the one terminal, the outputs of the focus detection portions read at the same time into the multiplexer.

16. The device according to claim 15, wherein each of the focus detection portions includes
   at least one row of pixels obtaining photoelectric charge from the subject image,
   a charge-voltage conversion amplifier for converting the photoelectric charge obtained from the pixel row,
   a charge transfer channel, arranged between the pixel row and the charge-voltage conversion amplifier, for transferring the photoelectric charge obtained from the pixel row to the charge-voltage conversion amplifier, and
   a driver for operating the charge transfer channel.

17. The device according to claim 16, wherein the pixel row is made up in such a manner that a plurality of pixel rows, each lined up in the same focus detection direction, are arranged in the direction substantially orthogonal to the focus detection direction.

18. The device according to claim 16, wherein the controller enables the operation of the driver to operate the charge transfer channel of each of the designated focus detection portions, while it disable the operation of the driver from operating the charge transfer channel of each of the focus detection portions that are not designated.

19. A focus detection device according to claim 16, wherein each of pixels constituting the pixel row is connected to a memory for varying the accumulation time of photoelectric charge for each pixel row.

20. The device according to claim 1, further comprising a memory for storing the digital data output from and converted by the A/D converter in order, wherein
   the sequencer arranges, in order of pixel rows, and reads out the digital data stored in the memory.

* * * * *